United States Patent [19]
Nishii et al.

[11] Patent Number: 6,088,128
[45] Date of Patent: *Jul. 11, 2000

[54] FACSIMILE MACHINE FOR CONTROLLING A POWER SUPPLY IN CONSONANCE WITH A DETECTED CALL SIGNAL

[75] Inventors: Teruyuki Nishii; Takehiro Yoshida, both of Tokyo; Yusuke Kadokura, Kamakura, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,212

[22] Filed: Sep. 6, 1995

[30] Foreign Application Priority Data

| Sep. 7, 1994 | [JP] | Japan | 6-239589 |
| Sep. 30, 1994 | [JP] | Japan | 6-237092 |
| Oct. 5, 1994 | [JP] | Japan | 6-241190 |
| Jan. 13, 1995 | [JP] | Japan | 7-021320 |

[51] Int. Cl.[7] .................. H04N 1/32; H04N 1/00
[52] U.S. Cl. .................. 358/434; 358/438; 358/468; 379/102.04
[58] Field of Search .................. 358/468, 434, 358/437, 436, 435, 438, 439; 379/100, 100.01, 100.05, 102.04

[56] References Cited

U.S. PATENT DOCUMENTS

| 4,593,323 | 6/1986 | Kanda et al. . | |
| 4,729,033 | 3/1988 | Yoshida | 358/435 |
| 4,815,121 | 3/1989 | Yoshida | 379/100 |
| 4,837,813 | 6/1989 | Terajima . | |
| 5,003,578 | 3/1991 | Lin | 379/100 |
| 5,022,072 | 6/1991 | Sakakibara et al. | 358/435 |
| 5,029,202 | 7/1991 | Doernbach, Jr. et al. | 379/245 |
| 5,142,569 | 8/1992 | Peters et al. . | |
| 5,194,968 | 3/1993 | Nakajima et al. | 358/438 |
| 5,325,209 | 6/1994 | Manabe | 358/437 |
| 5,410,419 | 4/1995 | Muramatsu et al. | 358/468 |
| 5,465,162 | 11/1995 | Nishii et al. | 358/442 |
| 5,559,860 | 9/1996 | Mizikovsky | 379/375 |
| 5,758,040 | 5/1998 | Ichimura et al. | 358/468 |

FOREIGN PATENT DOCUMENTS

| 0489917 | 6/1992 | European Pat. Off. . |
| 06311269 | 11/1994 | Japan . |
| 2231213 | 11/1990 | United Kingdom . |

OTHER PUBLICATIONS

Pat. Abs. Jp., vol. 012, No. 238 (P–726), Jul. 7, 1988 (JP 63029821A).

*Primary Examiner*—Scott Rogers
*Attorney, Agent, or Firm*—Fitzpatrick, Cella, Harper & Scinto

[57] ABSTRACT

In an apparatus that has a main power supply and a sub-power supply. In a standby state, the main power supply is turned on for an incoming call for facsimile communication, while the main power supply is not turned on for an incoming call for speech communication. Therefore, the unnecessary turning on and off of the main power supply can be prevented. When the DRPD (Distinguish Ringing Pattern Detect) service is provided, a plurality of telephone numbers are assigned to a single communication line, and a plurality of call signals whose pattern differ are employed for receiving calls. When one of these telephone numbers is used for facsimile and another telephone number is used for a telephone, an incoming call can be identified as being either for facsimile or for telephone by distinguishing between the patterns of the call signals. When the pattern of the call signal is for facsimile, the main power supply is turned on to perform data communication. When the pattern of the call signal is for telephone, the main power supply is not turned on.

28 Claims, 27 Drawing Sheets

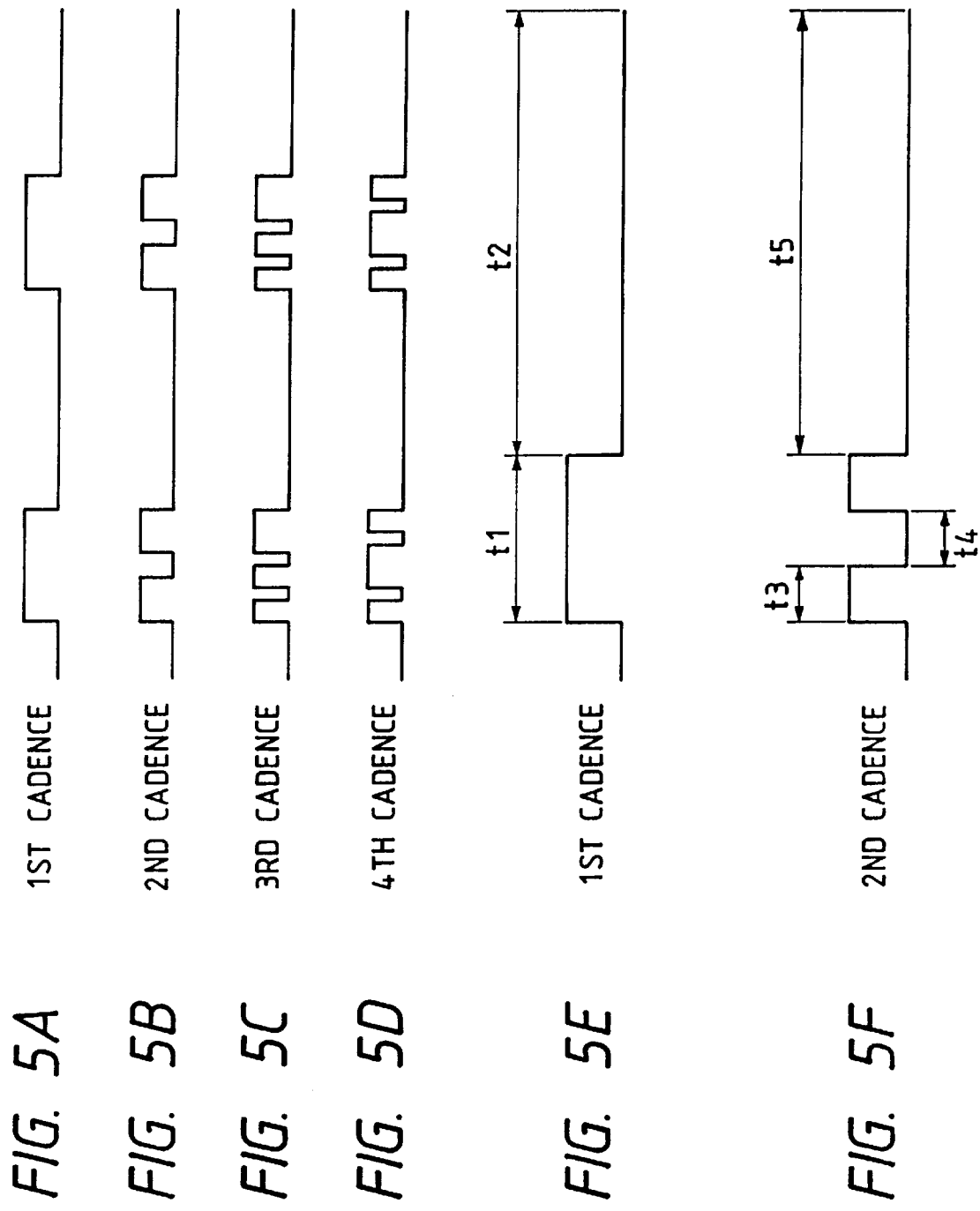

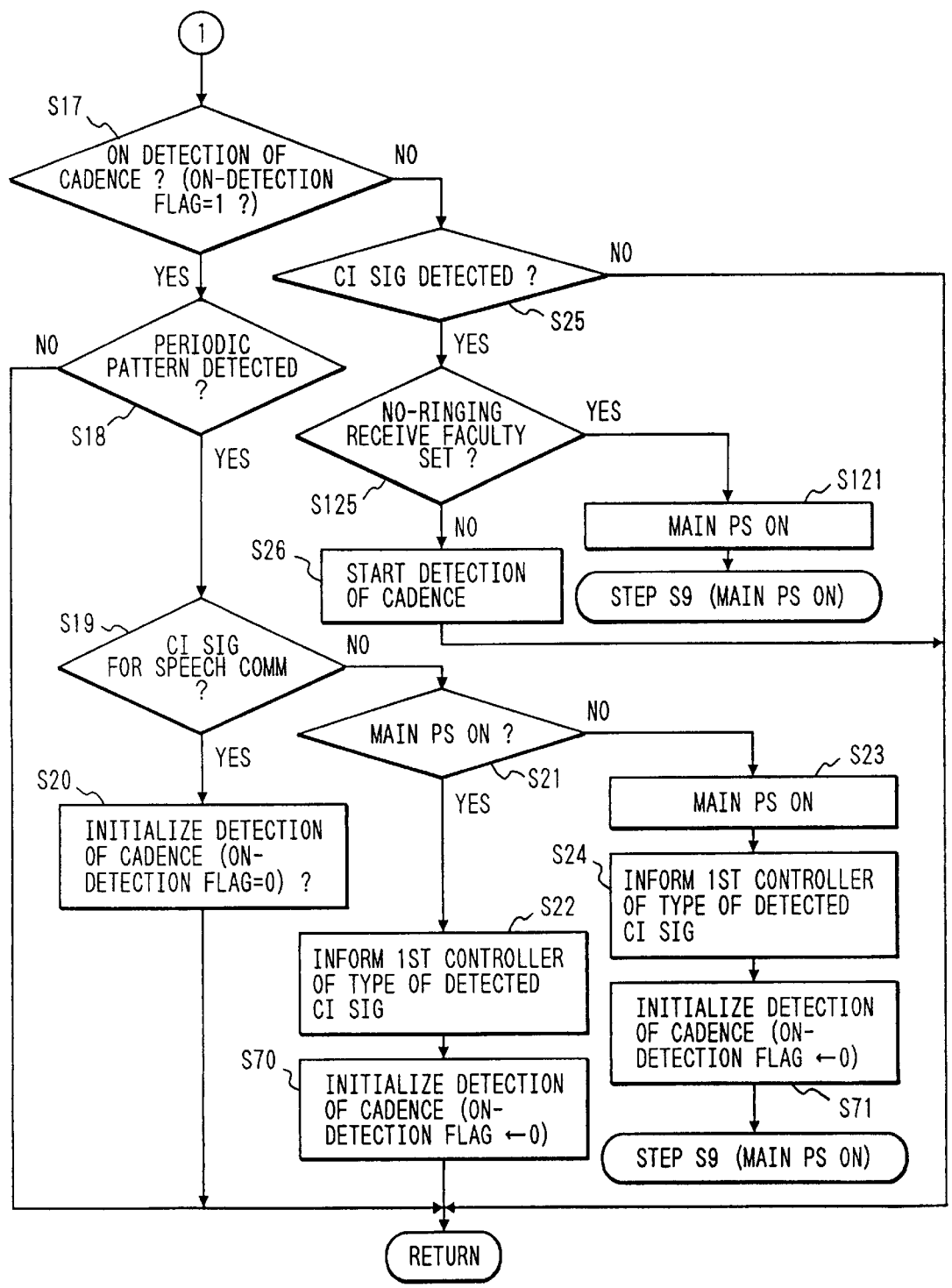

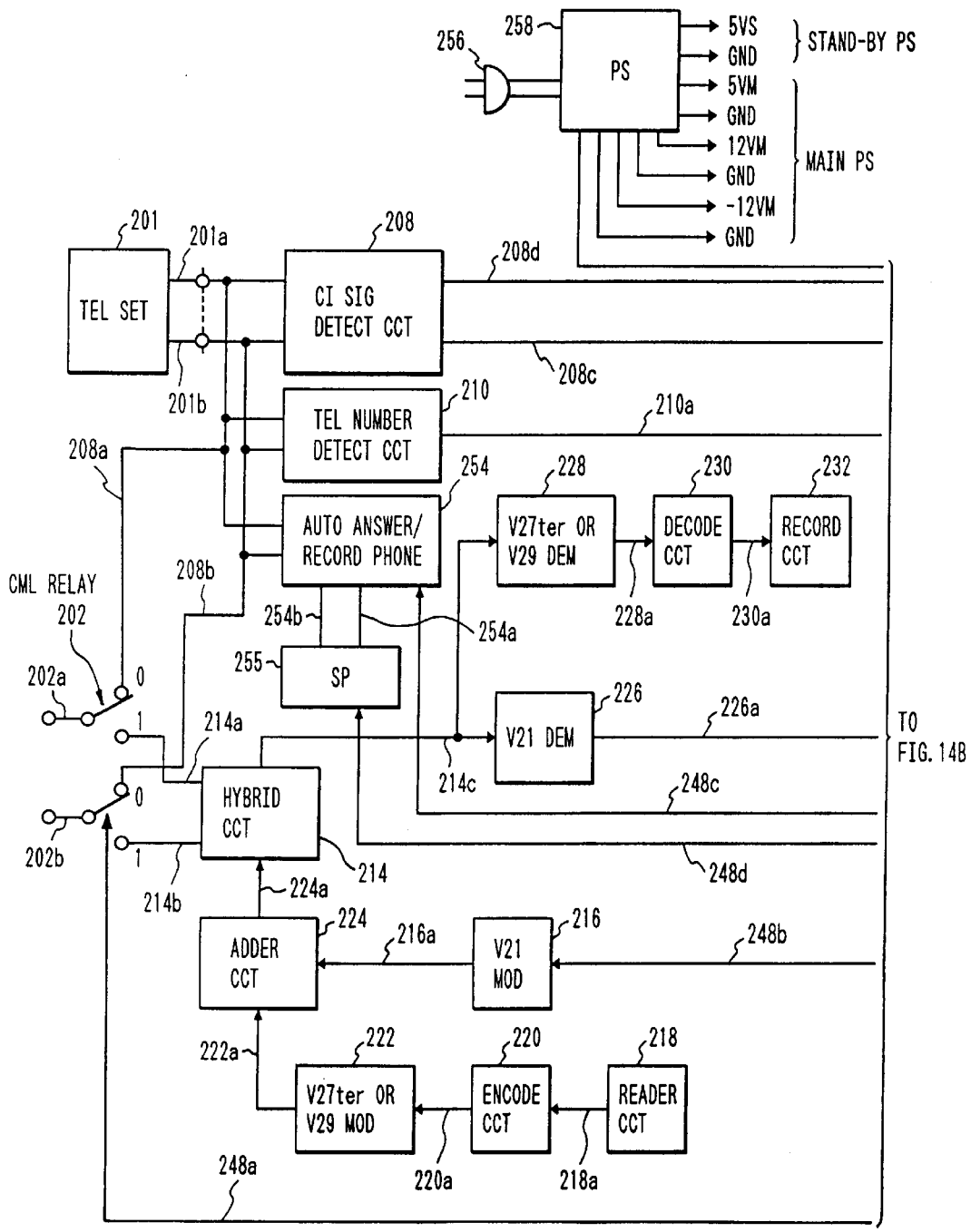

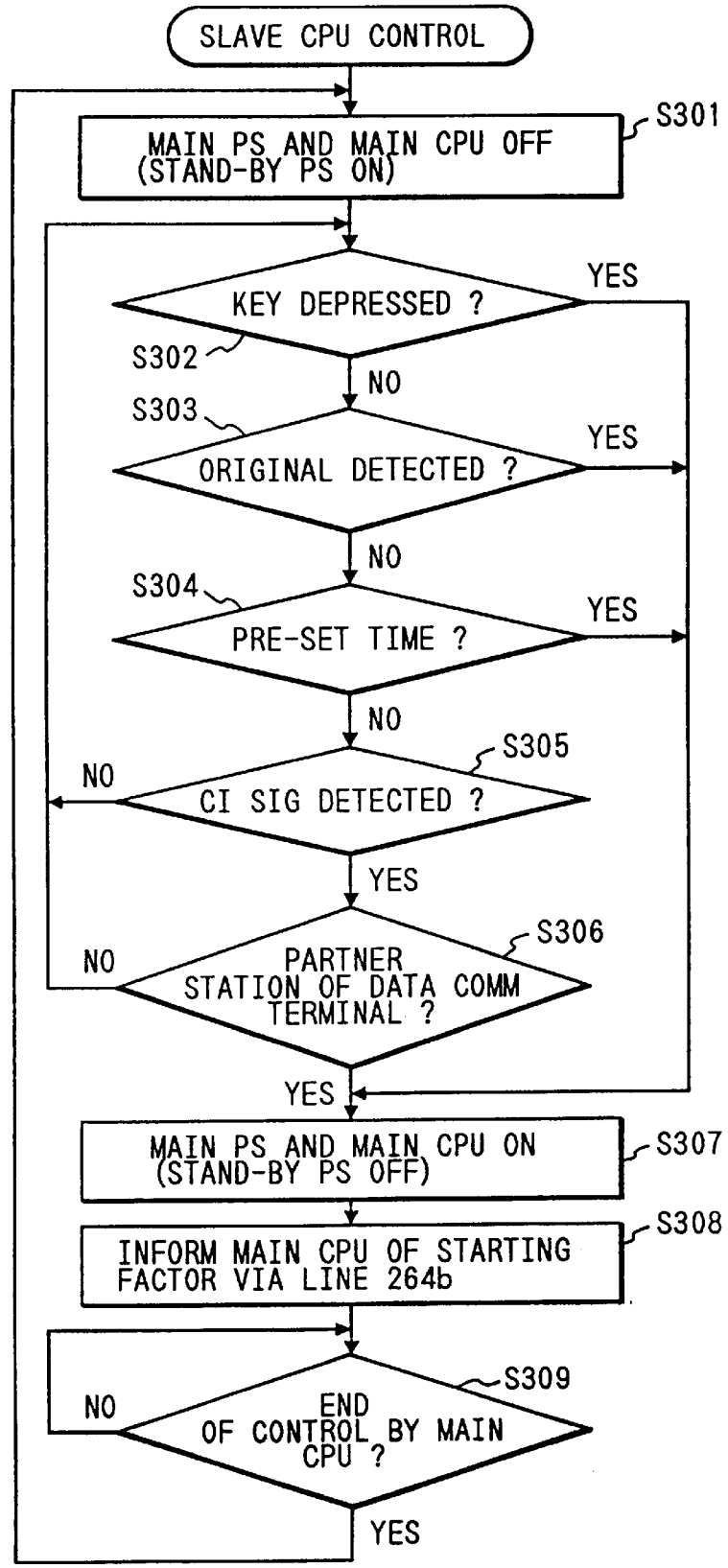

FACSIMILE MACHINE FOR CONTROLLING A POWER SUPPLY IN CONSONANCE WITH A DETECTED CALL SIGNAL

BACKGROUND OF THE INVENTION

1. Field of the Invention

The present invention relates to a facsimile machine in which the mode is shifted to a low power consumption mode while on standby.

2. Related Background Art

Conventionally, a switching power supply, etc., is employed as a power supply for an apparatus, such as a facsimile machine, that has a standby mode. Other than when such an apparatus is employed to transmit an original document, a constant supply of power must be furnished to keep the apparatus active and prepared to respond to non-periodical reception requests. Therefore, the primary side of a main power supply is controlled directly by using a call signal that is transmitted over a telephone line to reduce power consumption. Some apparatuses have an independent sub-power supply that is to be used while on standby, in addition to a main power supply. This type of apparatus is so designed that while in the standby state it is operated only by the sub-power supply and the main power supply is used only during full operation.

Further, an innovative system that is also intended to reduce power consumption in the standby state is proposed in Japanese Patent Application No. 5-101108, filed on Apr. 27, 1993 in Japan. This system is so designed that a second controller activates and deactivates a main power supply (switching power supply). A secondary battery is used to supply power to the second controller while on standby, with the main power supply being employed during full operation. According to this system, while on standby, the operation of the main power supply is halted and only the second controller is in operation. During full operation, the main power supply is held active while a control signal is supplied from the second controller to the main power supply. Thus, the reproduction in the power that is consumed is greater than it is with a conventional arrangement.

In the above described, newly proposed prior art system, however, since not only is it necessary to charge the second battery, but it is also necessary to detect call signals and key input for the activation of the main power supply, the following inconveniences occur.

(1) The main power supply is activated regardless of the type of call signal, even when an apparatus shares DRPD (Distinguish Ringing Pattern Detect) service.

(2) The main power supply is activated unconditionally in response to key input, even when the activation of the main system is not especially necessary, such as when the reception mode of the apparatus is altered. Thus, a user must wait until a period of time has elapsed that is required for the initialization of the apparatus.

It has recently become possible through the detection of a call signal to determine whether or not a terminal at a calling side is a data communication terminal such as fax communication terminal or a speech communication terminal. In other words, by detecting and identifying the telephone number that is transmitted between call signals, it can be determined whether or not the terminal at the calling side is a data communication terminal or a speech communication terminal.

When the terminal at the calling side is a data communication terminal, the activation of a main CPU is effected. On the other hand, when the terminal on the calling side is a speech communication terminal, the activation of the main CPU is a useless act, which would result in a great deal of energy being wasted and the durability of the machine being degraded.

In a conventional facsimile machine, however, when a slave CPU is activated by a sub-power supply, such as a second battery, detects a call signal, and determines that a terminal at the calling side is a speech communication terminal, a switching power supply that was halted is activated and begins to supply power to the main CPU. Therefore, a desired energy saving can not be realized, which results in a reduction in the service life of the apparatus.

In addition, in a facsimile apparatus wherein facsimile and TEL modes can be switched, when a communication line is captured by the facsimile apparatus and the apparatus is driven by the main power supply, a facsimile communication procedure signal can not be detected. After the TEL mode is called, the setup of the power supply that drives the apparatus can not be specified.

SUMMARY OF THE INVENTION

One object of the present invention is to improve the above described conventional shortcomings.

In addition, another object of the present invention is to provide a facsimile machine that can save more energy than can a conventional apparatus and that can improve the durability.

BRIEF DESCRIPTION OF THE DRAWINGS

FIGS. 5A to 5F are charts showing various cadences for a call signal;

FIG. 13 is a flowchart for a second embodiment;

FIG. 15 is a flowchart of the control procedures that are performed by a slave CPU in the third embodiment;

DETAILED DESCRIPTION OF THE PREFERRED EMBODIMENTS

First Embodiment

Figure 1:
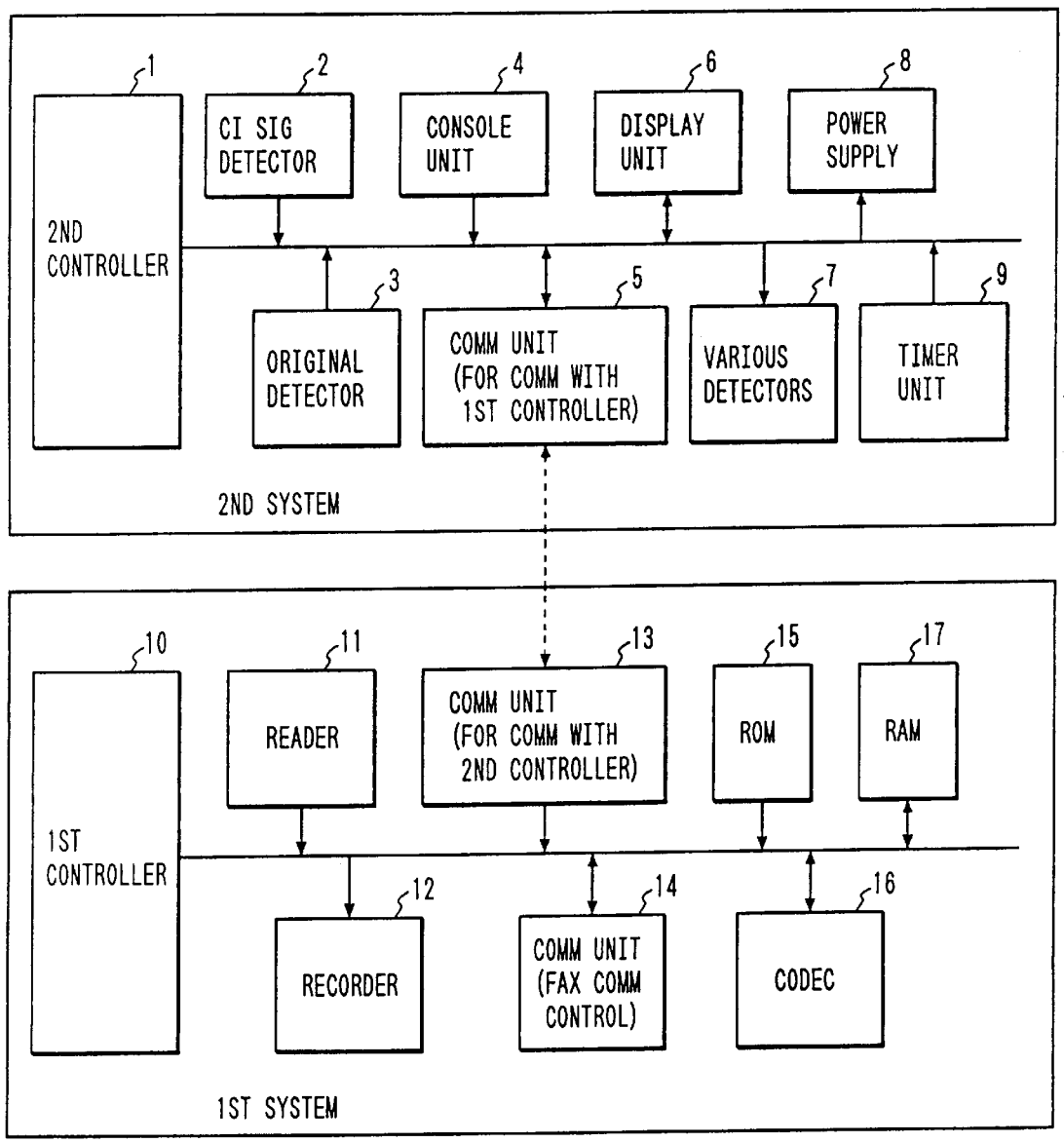
FIG. 1 is a block diagram illustrating a facsimile machine according to a first embodiment of the present invention.

In FIG. 1, a facsimile machine is designed with a first system and a second system.

The second system will be described first.

A second controller 1 includes a 1-chip microcomputer that incorporates a ROM and a RAM, which are employed for the reading and the writing of programs, variables and constants, and a secondary battery of a capacitor type. The second controller 1 can be driven by only the power from the secondary battery.

A call signal detector 2 detects a call signal received via a communication unit 14 and transmits the detection result to the second controller 1.

An original document detector 3 includes a mechanical original document sensor that is provided along an original document feeding path, and employs this sensor to detect the set state of an original document. The original document detector 3 transmits an original document detection signal to the second controller 1. In order not to consume power while on standby and waiting for the insertion of an original document, the mechanical original document sensor (mechanical switch) is used as an original document sensor, rather than a photointerrupter that employs a light emitting device. When a photointerrupter that uses a light emitting device is employed, the monitoring is not performed constantly, but periodically, after the lapse of a predetermined period of time, so that the average consumed power is reduced compared with that which is required for constant monitoring.

A console unit (or operation unit) 4 includes a start key for starting the transmission and the reception of an image; a mode select key for designating operation modes; fine, standard, and automatic reception modes; and number keys and one-touch keys for dialing. Upon the depression of a key, the information that corresponds to the depressed key is transmitted to the second controller 1, which in turn determines whether or not the information is a factor for activation. When the information is a factor for activation, the second controller 1 activates a main power supply.

A communication unit 5 exchanges various data with a first controller 10, to include a start signal from the first controller 10 to the second controller 1.

A display unit 6 includes an LCD module in which are combined a graphic character LCD, for displaying seven segments for a timer display and various modes, and a dot matrix LCD, and an LED. The graphic character LCD and the dot matrix LCD are independent.

A various state detector 7 includes detection means for determining the presence/absence of recording paper, for determining the presence/absence of a cartridge, and for determining the remaining quantities of ink and toner, and for determining hook-on/hook-off of a telephone handset.

A power supply 8 is an AC input switching power supply, and ON/OFF of the switching can be controlled by an external device. The power from the switching power supply is controlled by a drive signal and a stop signal that are transmitted by the second controller 1.

A timer unit 9 compares time information that is supplied by the second controller 1 with a time that is set in advance, and manages both times.

The first system will now be described.

According to a program that is stored in the ROM 15, the first controller 10 controls a reader 11, a recorder 12, a communication unit 13 that communicates with the second system, the communication unit 14 that controls facsimile communication, and a CODEC 16 that encodes and decodes an image. The first controller 10 refers to the states of the individual sections to determine whether or not the main power supply should be turned off. When the main power supply should be turned off, the first controller 10 forwards a main control OFF enabling signal to the second controller 1 via the communication units 13 and 5.

The reader 11 includes a DMA controller, an image processing IC, an image sensor, and a CMOS logic IC. Under the control of the first controller 10, the reader 11 employs a reading device, such as a contact sensor (CS), to binarize read data, and then sequentially transmits the binarized data to a RAM 17.

The recorder 12 includes a DMA controller, an ink-jet recording device or a laser beam recording device, and a CMOS logic IC. Under the control of the first controller 10, the recorder 12 extracts data that are stored in the RAM and prints a hard copy of the data.

The communication unit 13 exchanges various information with the second controller 1, to include a drive signal from the second controller 1 to the first controller 10. Upon the receipt of the drive signal, the first controller 10 begins the operation of the first system.

The communication unit 14 includes G3 and G2 modems, and a clock generator that is connected to these modems. Under the control of the first controller 10, the communication unit 14 modulates data that are stored in the RAM 17, and transmits the modulated data via the communication unit 14. Further, the communication unit 14 receives an analog signal and demodulates the signal to obtain binarized data, which are in turn stored in the RAM 17.

A RAM module 17 includes volatile RAM and non-volatile RAM. The volatile RAM is employed to store binarized image data that are read by the reader 11, binarized image data that are recorded by the recorder 12, and binarized image data that are obtained by data demodulation in the communication unit 14 and subsequent data decoding in the CODEC 16. The non-volatile RAM is employed for storing data (e.g., telephone numbers registered for one touch dialing and for speed dialing) that are to be saved even when the power of the apparatus is cut off.

Figure 2:
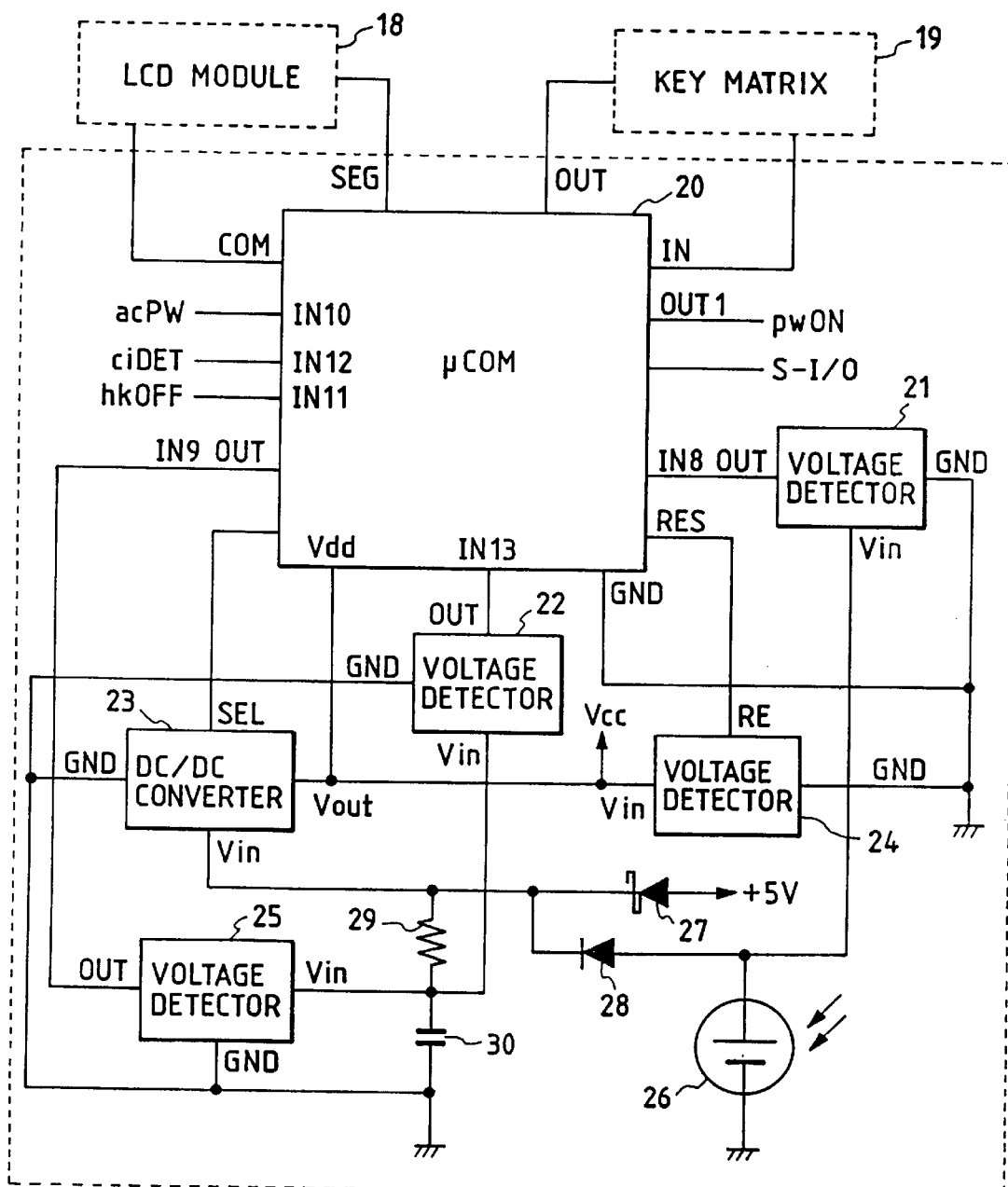
FIG. 2 is a schematic circuit diagram illustrating a second controller and the arrangement of its peripheral sections.
Figure 3:
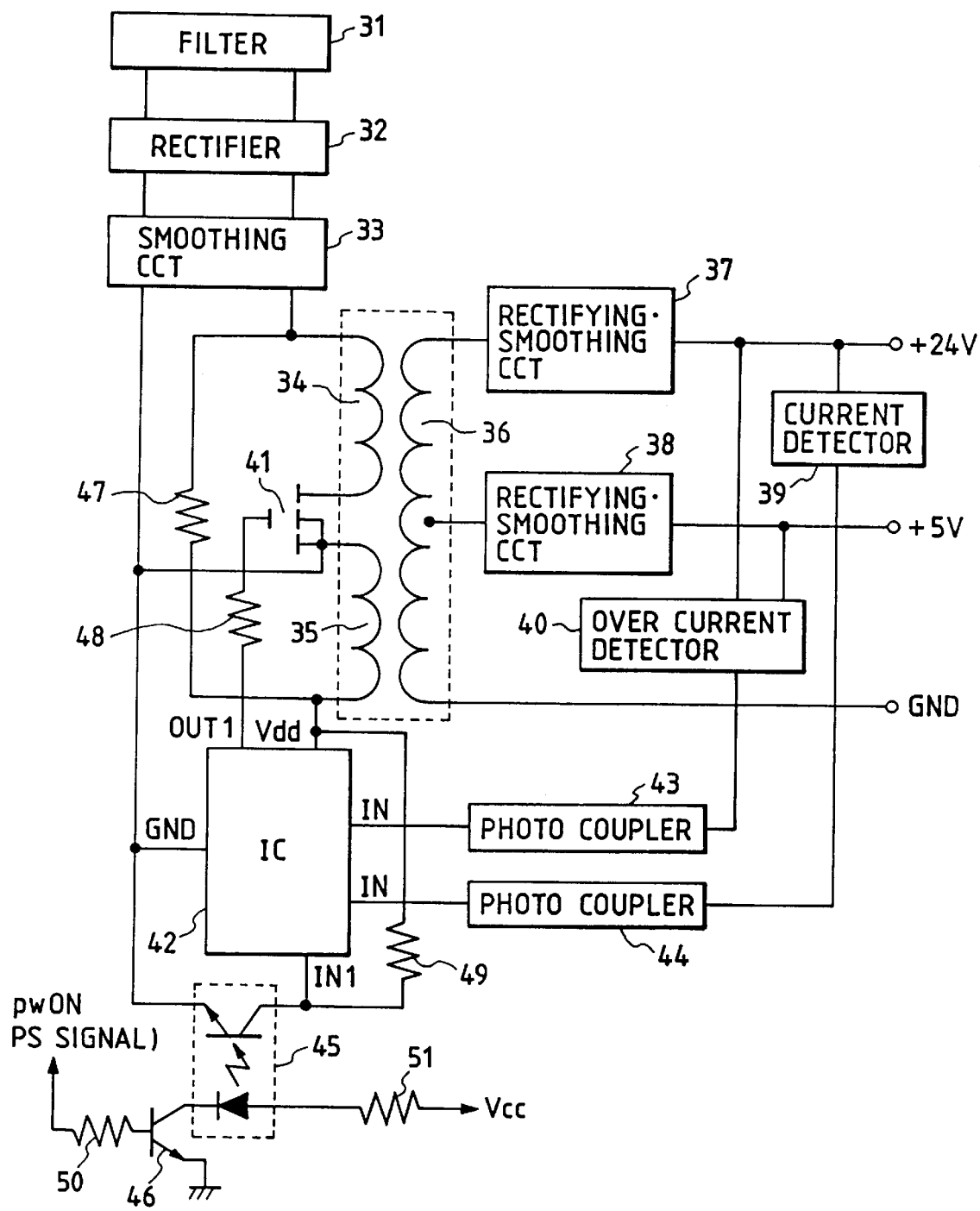
FIG. 3 is a schematic circuit diagram illustrating a main power supply.

FIG. 2 is a circuit diagram illustrating the schematic arrangement of the second controller 1 and the arrangement of its periphery. FIG. 3 is a diagram illustrating the schematic circuit arrangement of a main power supply (power supply 8) that is controlled by the second controller 1. FIGS.

4A and 4B are diagrams illustrating the schematic circuit arrangement of a call signal detector 2, a part of various state detector 7, and the periphery of the first controller 10. In these diagrams, the power supplies for the three systems are connected by Vcc via a DC/DC converter in FIG. 2: the first is the main power supply 8 of +5V, the second is a solar battery 26, and the third is a secondary battery 30 of a capacitor type. The priority for the employment of these three power supplies is determined by their voltages, the charged state of the secondary battery 30, a backflow preventing Schottky barrier diode 27, and a backflow preventing diode 28. The main power supply outputs 4.8V via the Schottky barrier diode 27, the solar battery 26 outputs 4.6V via the diode 28, and the secondary battery 30 outputs a voltage that depends on its charged state. According to the directions from the Schottky barrier diode 27 and the diode 28, when the main power supply is activated, its supply of power receives the highest priority. The secondary battery 30 is charged across a resistor 29 and power is supplied to Vcc via the DC/DC converter 23. At this time, the electric potential of the solar battery 26 is low, and no current flows therefrom. When the main power supply is not active and the solar battery 26 supplies power, i.e., when the main power supply is not in operation and photoenergy is supplied, if the secondary battery 30 has a higher potential than has the solar battery 26, power is supplied from the secondary battery 30 to Vcc via the DC/DC converter 23 and no power is supplied from the solar battery 26. If the secondary battery 30 has a lower potential than has the solar battery 26, power is supplied from the solar battery 26 to Vcc via the DC/DC converter 23, and at the same time, the secondary battery 30 is recharged across the resistor 29. When the main power supply is not driven and power is not supplied from the solar battery 26, power is supplied from the secondary battery 30 via the DC/DC converter 23.

In FIG. 2, a microcomputer 20 that can be operated at a low power incorporates timer means. The microcomputer 20 can exchange data with the first controller 10 via a serial interface S-I/O. A voltage detector 21 detects a voltage to determine whether or not the solar battery 26 is being used to supply power. When the detected voltage is higher than 2.5V, an OUT terminal of the voltage detector goes High. When the detected voltage is equal to or lower than 2.5V, the OUT terminal goes Low. The output from the OUT terminal of the voltage detector 21 is transmitted to a terminal IN8 of the microcomputer 20. The voltage of the secondary battery 30 in the discharged state is detected by a voltage detector 25. When the detected voltage is higher than 1.2V, an OUT terminal of the voltage detector 25 goes High, and when the detected voltage is equal to or lower than 1.2V, the OUT terminal of the voltage detector 25 goes Low. The output from the OUT terminal of the voltage detector 25 is transmitted to a terminal IN9 of the microcomputer 20. The voltage of the secondary battery 30 in the fully charged state is detected by a voltage detector 22. When the detected voltage is higher than 4.8V, an OUT terminal of the voltage detector 22 goes High, and when the detected voltage is equal to or lower than 4.8V, the OUT terminal of the voltage detector 22 goes Low. The output from the OUT terminal of the voltage detector 22 is sent to a terminal IN13 of the microcomputer 20. The DC/DC converter 23 serves as a series regulator when the input voltage is higher than the output voltage, while it serves as a booster switching regulator and a series regulator when the input voltage is lower than the output voltage. The output voltage can be selected, either 5V or 3V; the 5V voltage is output when an input port SEL is High, and the 3V voltage is output when the input port SEL is Low. When the voltage at an input terminal Vin of the DC/DC converter 23 is equal to or higher than 0.9V, either 5V or 3V is constantly output from its output terminal Vout. A voltage detector 24 that resets the microcomputer 20 transmits its output from a terminal RE to the RESET terminal of the microcomputer 20. When the voltage at the terminal Vout of the DC/DC converter 23 is equal to or lower than 2.7V, the terminal RE of the voltage detector goes Low, and when the voltage at the terminal Vout is higher than 2.7V, the terminal RE of the voltage detector 24 is maintained Low for a time delay period that is required for the resetting of the microcomputer 20 and then goes High. An LCD module 18, the above described component of the display unit 6, is controlled by the microcomputer 20. A key matrix circuit 19 scans various keys (identifies depressed keys), and can identify a depressed key under the software control exercised by the microcomputer 20. A mechanical original document detection switch (or a read switch) that is provided along an original document feeding path is also mounted in the key matrix circuit 19. As an original document sensor, the mechanical original document detection switch is employed rather than a photointerrupter that uses a light emitting device because power is not consumed while on standby waiting for the loading of an original document. Therefore, the secondary battery 30 can be prevented from becoming exhausted.

In FIG. 3, the AC input is supplied to a primary and a secondary insulating transformer via a filter 31, a rectifier 32, and a smoothing circuit 33, and is switched by an FET 41. Reference number 34 denotes a primary winding and reference number 36 denotes a secondary winding. An IC 42 controls the oscillation of the primary transformer, and power supply Vdd is supplied by an auxiliary winding 35 that is wound in the transformer. The secondary transformer supplies voltages of +24V and +5V from the secondary winding to the first system and the second system through the rectifying.smoothing circuits 37, 38, respectively. The outputs of a current detector 39 and an overcurrent detector 40 are fed back to an IC 42 via photocouplers 43 and 44, respectively. The IC 42 performs PWM control by employing a current on the secondary side, and shuts down the entire system when an overcurrent is detected. A PS signal, which is a special signal in this embodiment, is transmitted via a photocoupler 45 to the IC 42. When the PS signal is High, a transistor 46 is turned on and a current flows to the photocoupler 45, which in turn performs current-voltage conversion. Then, an input port IN1 of the IC 42 goes Low, and in response to this, power at an output port OUT1 of the IC 42 is oscillated. The primary side is then oscillated through the FET 41 to supply power to the secondary side, and the main power supply is activated.

When the PS signal is Low, the transistor 46 is turned off and the terminal IN1 of the IC 42 goes High. In response to this, the output port OUT1 of the IC 42 goes Low. The FET 41 is then turned off to halt the oscillation at the primary side and the driving of the main power supply is halted. When, for example, a hooking switch is depressed while on standby, an ON signal is output by the key matrix circuit 19. Upon the receipt of the ON signal, the microcomputer 20 activates the main power supply by setting the terminal OUT1 High, i.e., the PS signal High, and transmits the received information via the serial interface S-I/O to the first controller 10, which in turn controls the communication unit 14 to set an off-hook state. Reference numbers 47, 48, 49, 50 and 51 denote current-controlled resistors. The photocoupler 45 also insulates the primary side and the secondary side.

Figure 4A:
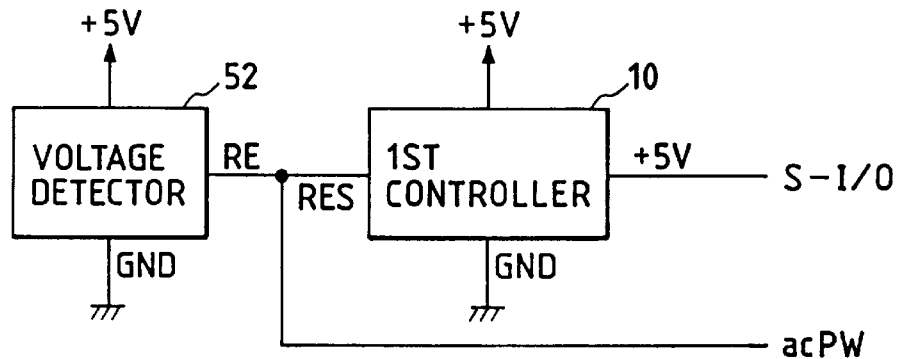
FIGS. 4A and 4B are schematic circuit diagrams illustrating the periphery of a first controller and other essential sections.
Figure 4B:
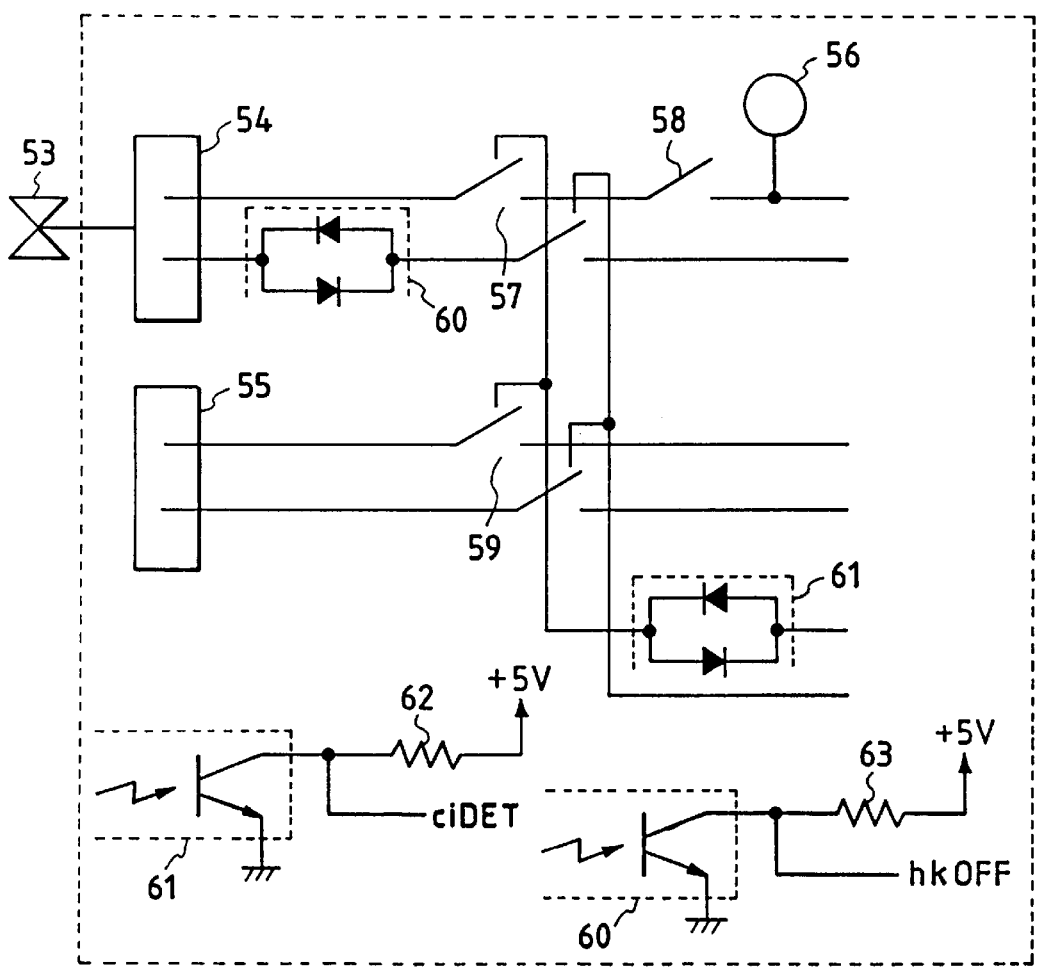

In FIG. 4A, a voltage detector 52, which resets the first controller 10, sends its output RE to a RESET terminal of the first controller 10. When the +5V voltage from the main voltage is equal to or lower than 4.5V, the terminal RE of the voltage detector 52 is Low, and when the voltage is higher than 4.5V, the terminal RE is maintained Low for a time delay period that is required for the resetting of the first controller 10 and the first controller 10 is reset. Then the terminal RE goes High. The output from the terminal RE is also transmitted to the terminal IN10 of the microcomputer 20 and is monitored. In FIG. 4B, a photocoupler 61 detects a call signal (CI signal). Upon receipt of a call signal via the communication unit 14, an incoming signal (Low) is transmitted to the terminal IN12 of the microcomputer 20. When a call signal is received while on standby, an incoming signal (Low) is sent to the microcomputer 20, which in turn determines whether or not that signal matches a call signal cadence (an ON/OFF pattern) that is designated in advance by the first controller 10. When the incoming signal matches the call signal cadence, the main power supply is activated with the terminal OUT1 High, i.e., with the PS signal High. The decision information is transmitted via the serial interface S-I/O to the first controller 10, which in turn controls the individual blocks. A photocoupler 60 that detects the picking up of a handset is so designed that when the handset is picked up a Low level signal is transmitted to the terminal IN11 of the microcomputer 20. When the handset is picked up while on standby, the Low level signal is transmitted to the microcomputer 20. The microcomputer 20 recognizes it and activates the main power supply with the terminal OUT1 High, i.e., with the PS signal High. The microcomputer 20 then sends the information via the serial interface S-I/O to the first controller 10, which in turn controls the individual blocks. Reference numbers 62 and 63 are current-controlled resistors; 54 and 55, modular jacks; 53, a telephone set; 57 and 59, hook up relays; and 56, a call signal generator.

FIGS. 5A to 5F are cadences for a call signal that is transmitted to a line for which the DRPD (Distinguish Ringing Pattern Detect) service is provided. Calls for speech communication and calls for facsimile communication correspond to the individual cadences.

FIGS. 6 through 11B are flowcharts of processing for the first embodiment. The processing will now be described while referring to these flowcharts.

Figure 6:
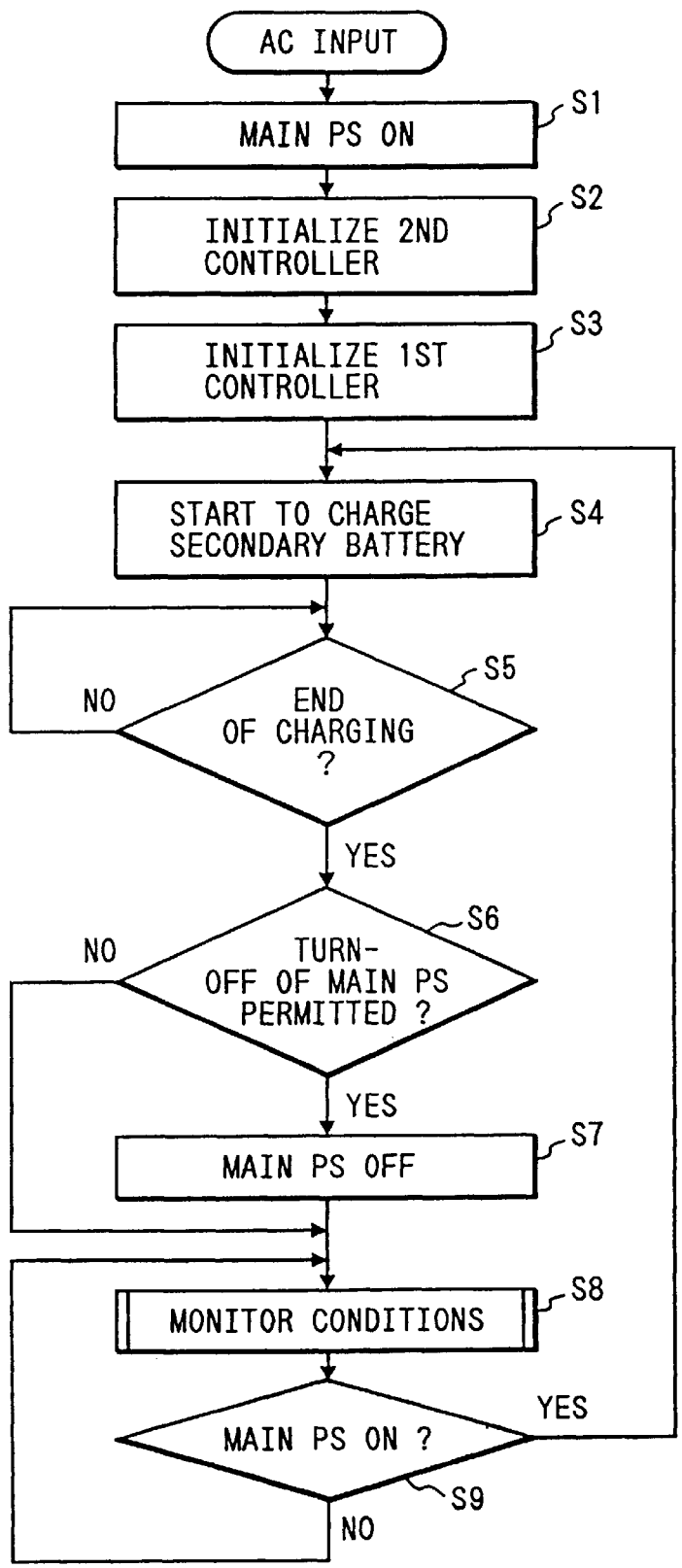
FIG. 6 is a flowchart for the first embodiment.

The flowchart in FIG. 6 shows the processing during the standby for facsimile. When an AC input is begun, first, the main power supply is powered on (step S1). The microcomputer 20 is initialized (step S2) and the first controller 10 is also initialized (step S3). At the same time, the charging of the secondary battery 30 is begun (step S4). When the initialization of the microcomputer 20 has been completed, the facsimile machine is in the standby state. While the standby state is maintained, the charging of the secondary battery 30 is continued. When the charging has been completed (step S5) and when the output of the voltage detector 22 is High, since the terminal IN13 of the microcomputer 20 accordingly goes High, the terminal OUT1 of the microcomputer 20, i.e., the PS signal, is set Low and the operation of the main power supply is halted (step S7). Accordingly, the terminal RE of the voltage detector 52 goes Low and the first controller 10 is reset. When the charging has been completed (step S5) and when a predetermined time has elapsed, which is measured by a timer that is incorporated in the microcomputer 20, an interrupt occurs and the microcomputer 20 sets the terminal OUT1 Low, i.e., sets the PS signal Low, and halts the operation of the main power supply (step S7). Accordingly, the terminal RE of the voltage detector 52 goes Low and the first controller 10 is reset.

When the main power supply is not permitted to be powered off, according to an instruction of the first controller 10, the main power supply is not powered off in either of the above described cases (see step S6).

When the main power supply is turned off, the supply of power that involves the use of only the secondary battery 30 and the solar battery 26 begins. At this time, recharging of the secondary battery 30 is performed by using power that is supplied by the solar battery 26 that is in excess of the power requirements.

Then, the various conditions are monitored until a factor for activating the main power supply is detected (step S8). The factors for activating the main power supply are a request for charging, detection of a call signal, key input, detection of an original document, detection of a change in the condition of the apparatus, the start of a timing process (timer transmission), etc. At step S9, a check is performed to determine whether or not the main power is in the ON or the OFF state. When the main power supply is ON, program control returns to step S4. When the main power supply is OFF, program control returns to step S8.

Figure 7:
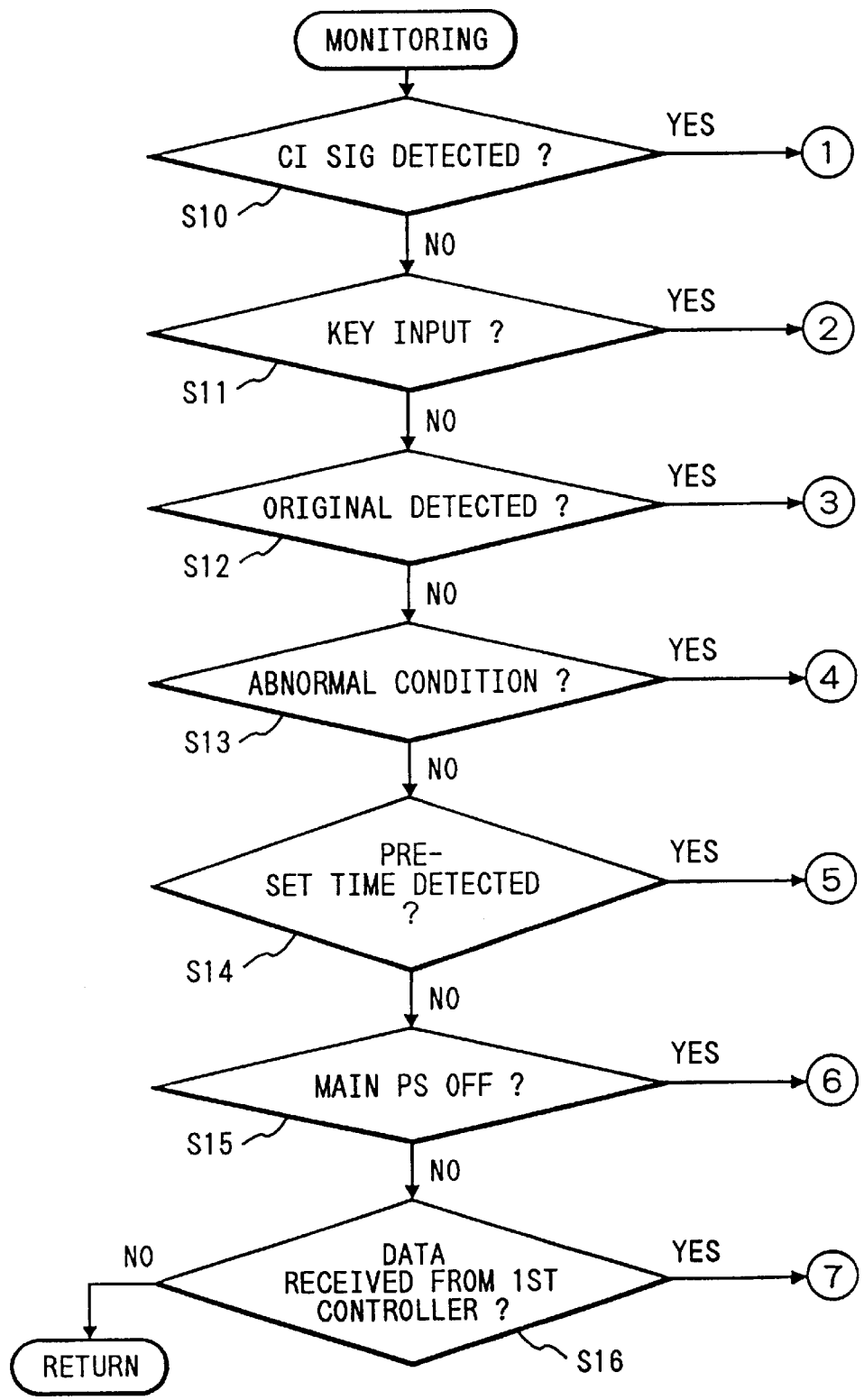
FIG. 7 is a flowchart for the first embodiment.

The flowchart in FIG. 7 shows condition monitoring processing in FIG. 6. The various conditions for activation of the main power supply (steps S10 through S15) and the data reception from the first controller 10 (step S16) are monitored. The conditions for the activation of the main power supply are the detection of a call signal (step S10), the detection of key input (step S11), the detection of the loading of an original document (step S12), the detection of an abnormality of the apparatus (step S13), the detection of a designated time (step S14), and a reduction in the output by the secondary battery 30 and the solar battery 26. The data reception from the first controller 10 is performed when the second controller 1 is operated with the main power supply in the active state.

Figure 8:
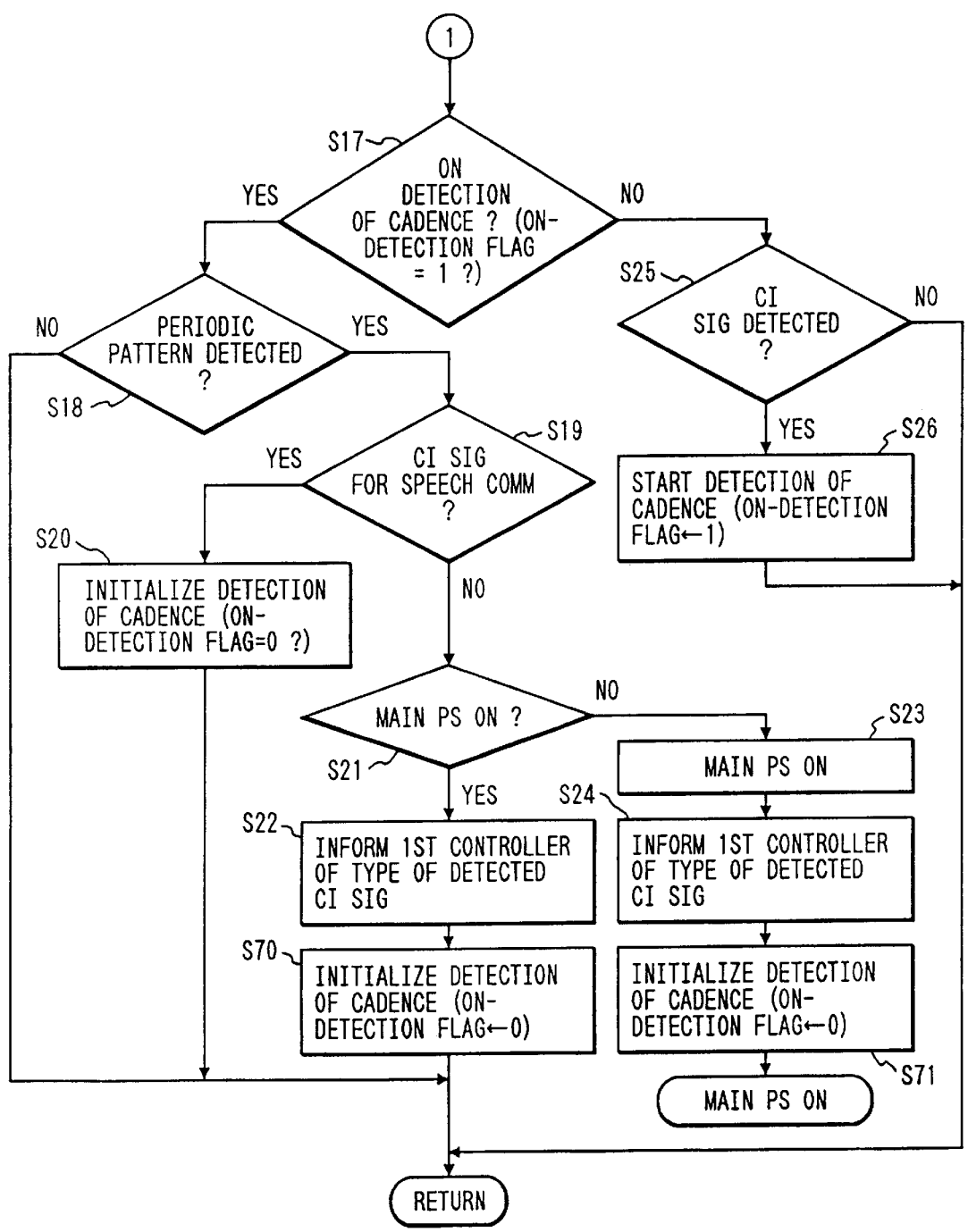
FIG. 8 is a flowchart for the first embodiment.

In the call signal detection process shown in FIG. 8, first, at step S17, a check is performed to determine whether or not detection of a cadence is being performed (whether on-detection flag=1 or 0). If the detection is being performed, program control advances to step S18. If the detection is not being performed, program control goes to step S25. At step S25, a check is performed to determine whether or not a call signal has been continuously detected since step S10. When the signal has been continuously detected, at step S26 detection of a cadence is begun and the on-detection flag is set to 1.

At step S18, a ciDET signal that is detected by the communication unit 14 and the photocoupler 61 is monitored, and a check is performed to determine whether or not that signal is a call signal that is designated in advance by the first controller 10. Information about a call signal that is designated by the first controller 10 concerns the cadence of a signal, and includes ON time, OFF time, detected cycles, and the identification of these cadences as call signals for speech communication or as call signals for facsimile. This is because, when a connected communication line shares the DRPD service, call signals are distinguished by determining which of several types of cadences they have, as is shown in FIGS. 5A to 5F. Whether a transmitter desires to place a phone call or to perform facsimile communication can be distinguished by determining the cadence of a call signal without connecting the call. When the detected ciDET signal is a phone call signal (YES at step S19), the microcomputer 20 does not need to activate the facsimile machine and maintains the standby state (step S20). When the ciDET signal is a facsimile call signal (NO at step S19), the microcomputer 20 separates the handset from the communication line by hook relay 57, and at step S21, the condition of the power supply is examined. When the power supply is OFF (NO at step S21), the main power supply is powered on without performing ringing for speech communication (step S23), and the mode is shifted to facsimile communication (step S24). When the detected ciDET signal is neither for speech communication nor for facsimile communication, a check may be performed to determine whether the ciDET signal is a common cadence for speech communication and facsimile communication, designated as detection information by the first controller 10. If the ciDET signal is such a signal, the main power supply may be powered on as well as when the detected ciDET signal is a call signal for facsimile (step S23), and the first controller 10 may be also activated (step S24).

When the facsimile communication is terminated and a communication line is disconnected, information on these facts is transmitted via the serial interface S-I/O to the microcomputer 20 (YES at step S6 in FIG. 6), which halts the operation of the main power supply with the PS signal set Low. The charging of the secondary battery 30 is terminated, and the operational state of the apparatus is returned to the FAX standby state.

In FIG. 8, when at step S21, the main power supply has already been switched ON, at step S22, the same procedure as at step S24 is performed. At steps S20, S70 and S71, the detection of a cadence is initialized (the on-detection flag is reset to 0).

Figure 9:
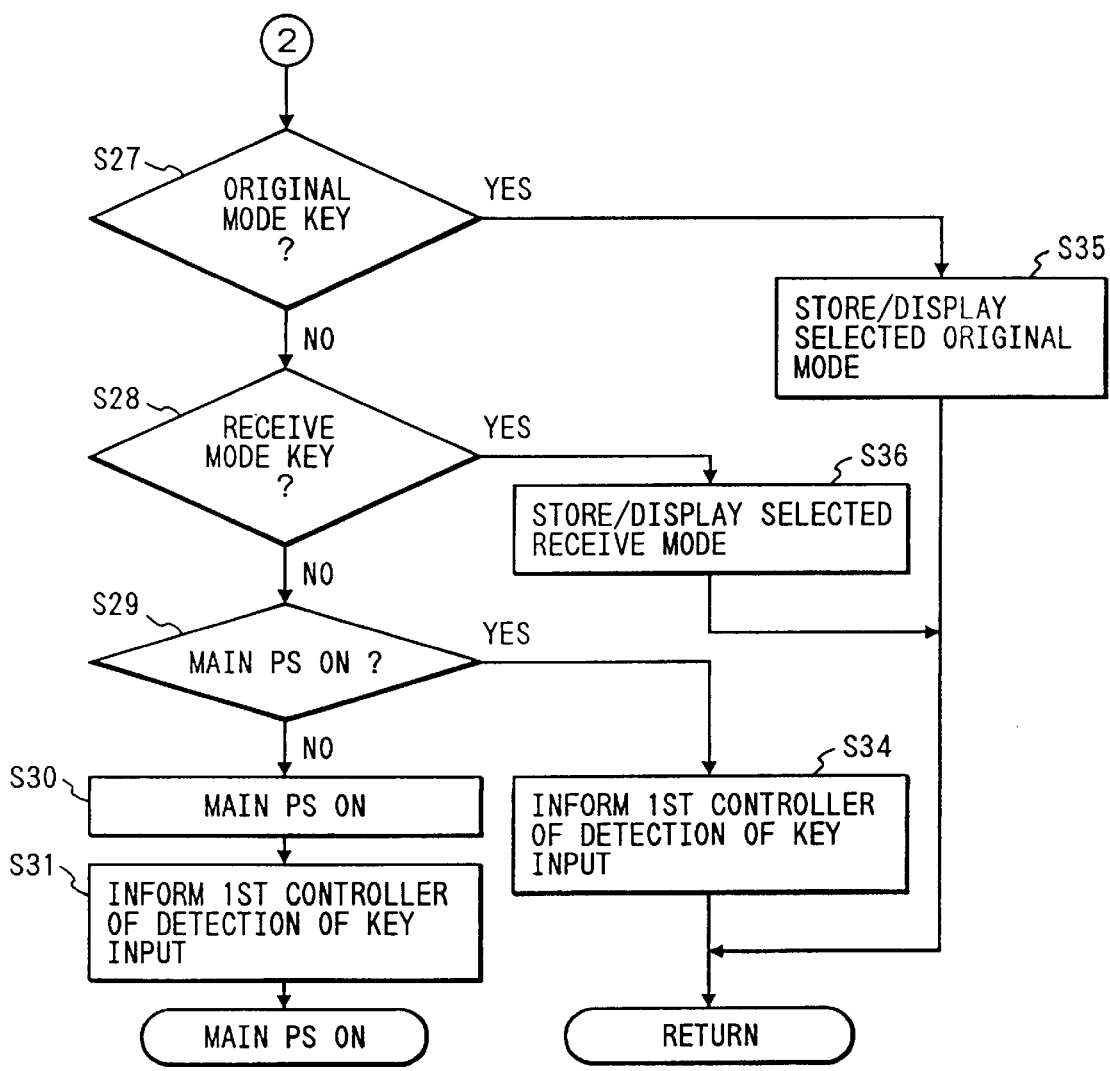
FIG. 9 is a flowchart for the first embodiment.

In the detection process for key input in FIG. 9, the input by various keys on the console unit 4 is monitored. When key input is detected, a check is performed to determine whether or not the key input is a factor for activating the first controller 10. The key types for common facsimile machines are: dialing keys (ten-key, one-touch keys, abbreviation dialing keys, an on-hook dialing key, etc.); a start key for image transmission and reception; an original document mode select key (step S27) for designating an operational mode, such as fine, standard and automatic reception during the communication; a reception mode select key (step S28), which is related to the detection of a call signal and which is used to select a mode for speech communication, a mode for automatically starting facsimile communication, and a mode for automatically switching these modes in consonance with the cadence of a call signal; a key for beginning registration; and a key for halting or canceling the operation. When the first controller 10 is activated each time a mode is selected in the original document mode selection process (step S27) and the reception mode selection process (step S28), such selection may affect the operation, such as processing for limiting key inputs during a period required for the initialization, and processing concerning communication between the first controller 10 and the microcomputer 20. Therefore, the microcomputer 20 may control the mode, and, for example, the information that the original document mode is selected may be transmitted when the first controller 10 is actually activated. In this embodiment, when a detected key is the original document mode selection key or the reception key, that information is managed by the microcomputer 20 without powering on the main power supply. When the detected key is any key other than these, the main power supply is powered on to activate the first controller 10.

Figure 10A:
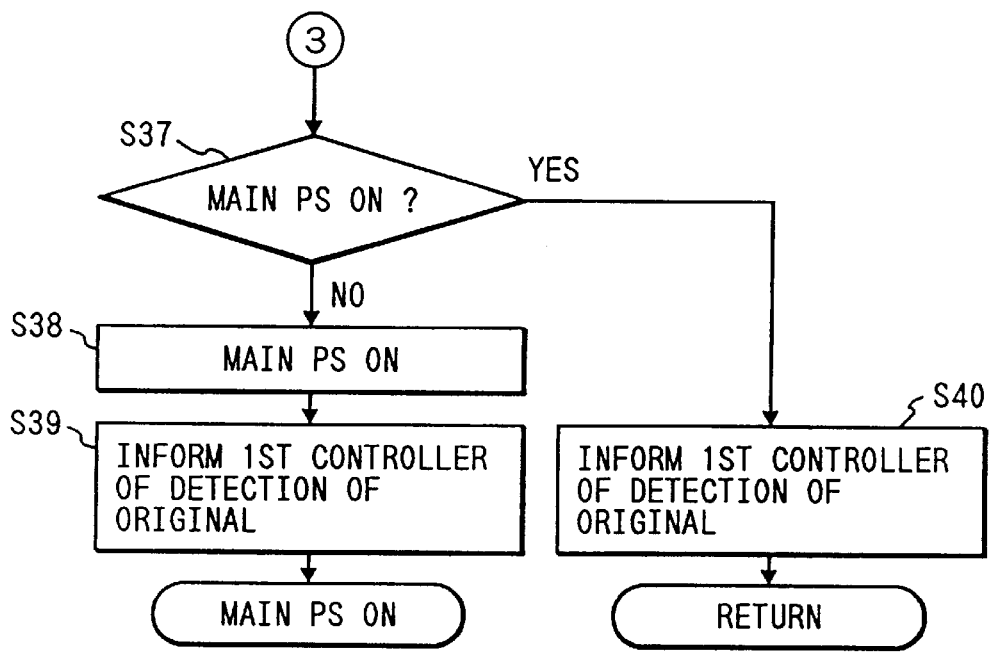
FIGS. 10A and 10B are flowcharts for the first embodiment.

In the process for detecting an original document shown in FIG. 10A, an original document sensor is monitored and when it detects the insertion of an original document, the main power supply is activated (step S38). If the main power supply need not be activated until a certain time arrives, such as transmission of an original document by starting a timer, or if a predetermined period of time has elapsed since the original document was inserted, upon the receipt of the permission to power off the main power supply, the main power supply is turned off regardless of the state of the original document sensor, and the operational state is shifted to the standby state.

Figure 10B:
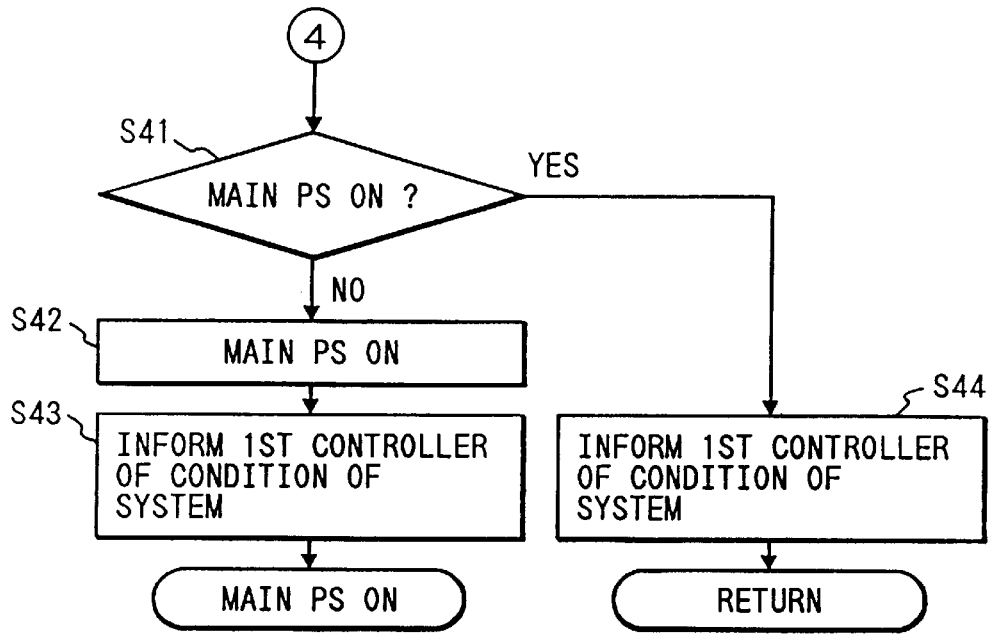

In the process for detecting a change in the condition of the apparatus shown in FIG. 10B, an event, such as the detachment of the cartridge of the recorder, that relates to a condition change that is not a factor for the activation of the main power supply is monitored. When such an event is detected, that detection information is reported to the first controller 10 when it is activated. When an event that is a factor for the activation of the main power supply, such as when a recording sheet is extracted while all reception memory is in use and thus data can not be received, the main power supply is powered on (step S42) and an error process is performed (steps S43 and S44).

Figure 11A:
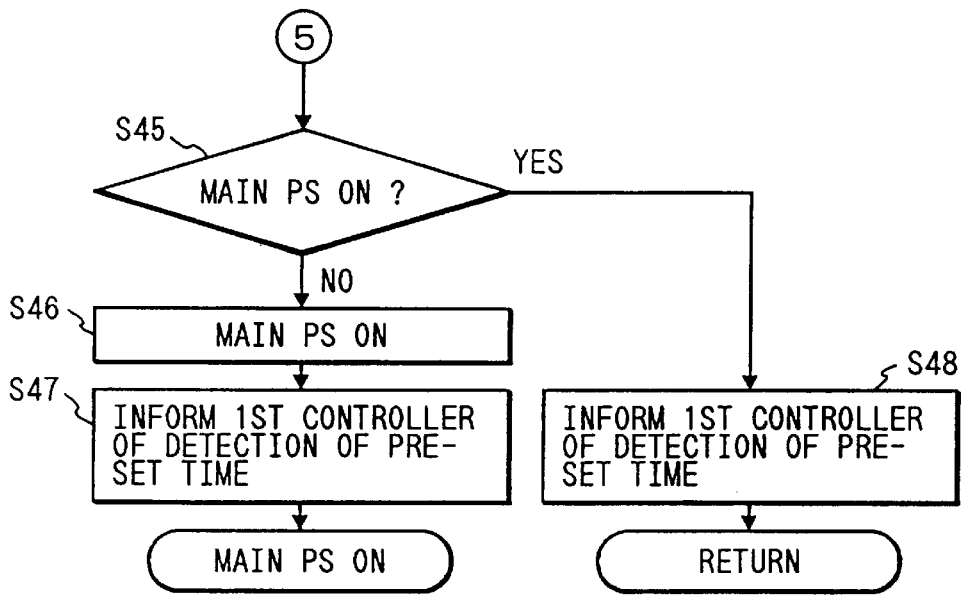
FIGS. 11A and 11B are flowcharts for the first embodiment.

In the monitoring process for activating a timer in FIG. 11A, a time that is designated by the first controller 10 is compared with the time that is counted in the microcomputer 20. When both times match, the main power supply is powered on (step S46), and the first controller 10 is operated and informed of the activation of the timer (steps S47 and S48).

Figure 11B:
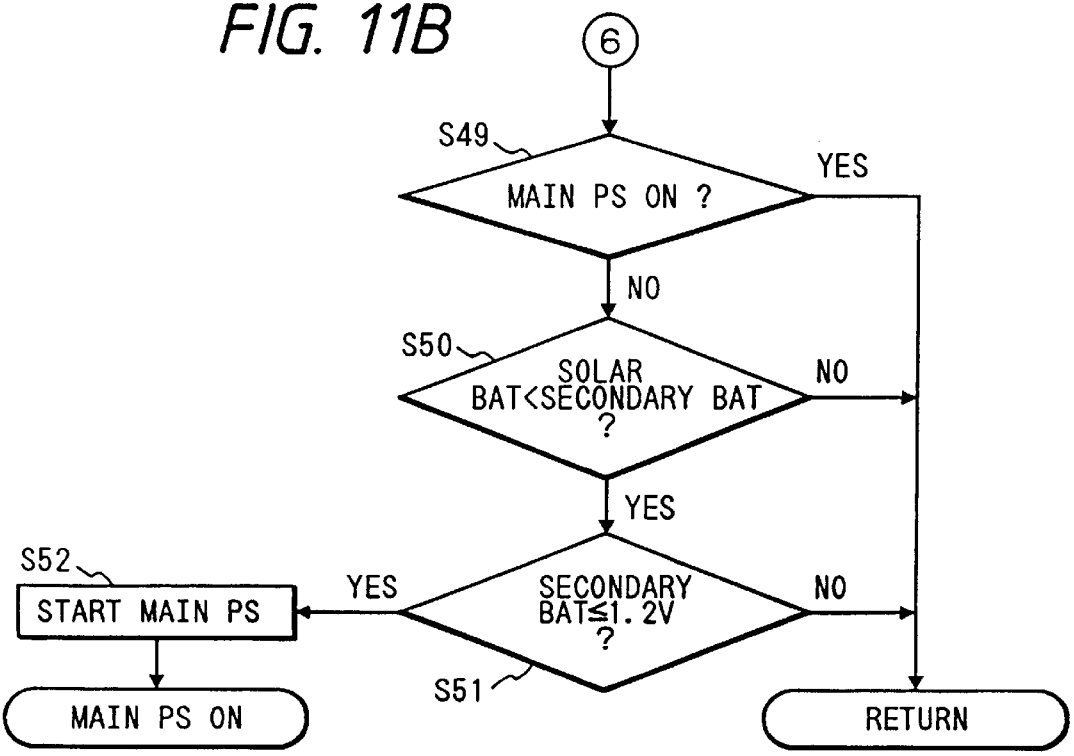

In the monitoring process for a charging request in FIG. 11B, a check is performed to determine whether or not power that is supplied from the solar battery 26 is reduced and its potential has become lower than that of the secondary battery 30 (step S50). Further, whether the secondary battery 30 is discharged and its voltage is equal to or lower than 1.2V is monitored at the terminal IN9 (step S51). When a request for charging is detected (step S52), the microcomputer 20 sets the terminal OUT1 High, i.e., sets the PS signal High. Then, the transistor 46 is rendered on, and, accordingly, the photocoupler 45 is turned on and the terminal IN1 of the IC 42 goes Low. Thus, the terminal OUT1 of the IC 42 is excited and the primary side is excited via the FET 41 to supply power to the secondary side. The main power supply is therefore activated. When the main power supply is powered on, the first controller 10 is initialized by the voltage detector 52, and the charging of the secondary battery 30 is also begun. In this manner, while the FAX standby state is maintained, the secondary battery 30 is recharged.

When the main power supply is powered on, the charging of the second battery 30 is begun. The charging is continuously performed while the state of the main power supply is ON. This information is transmitted via the serial interface S-I/O to the first controller 10, which thereafter controls mainly the processing for the apparatus.

Figure 12:
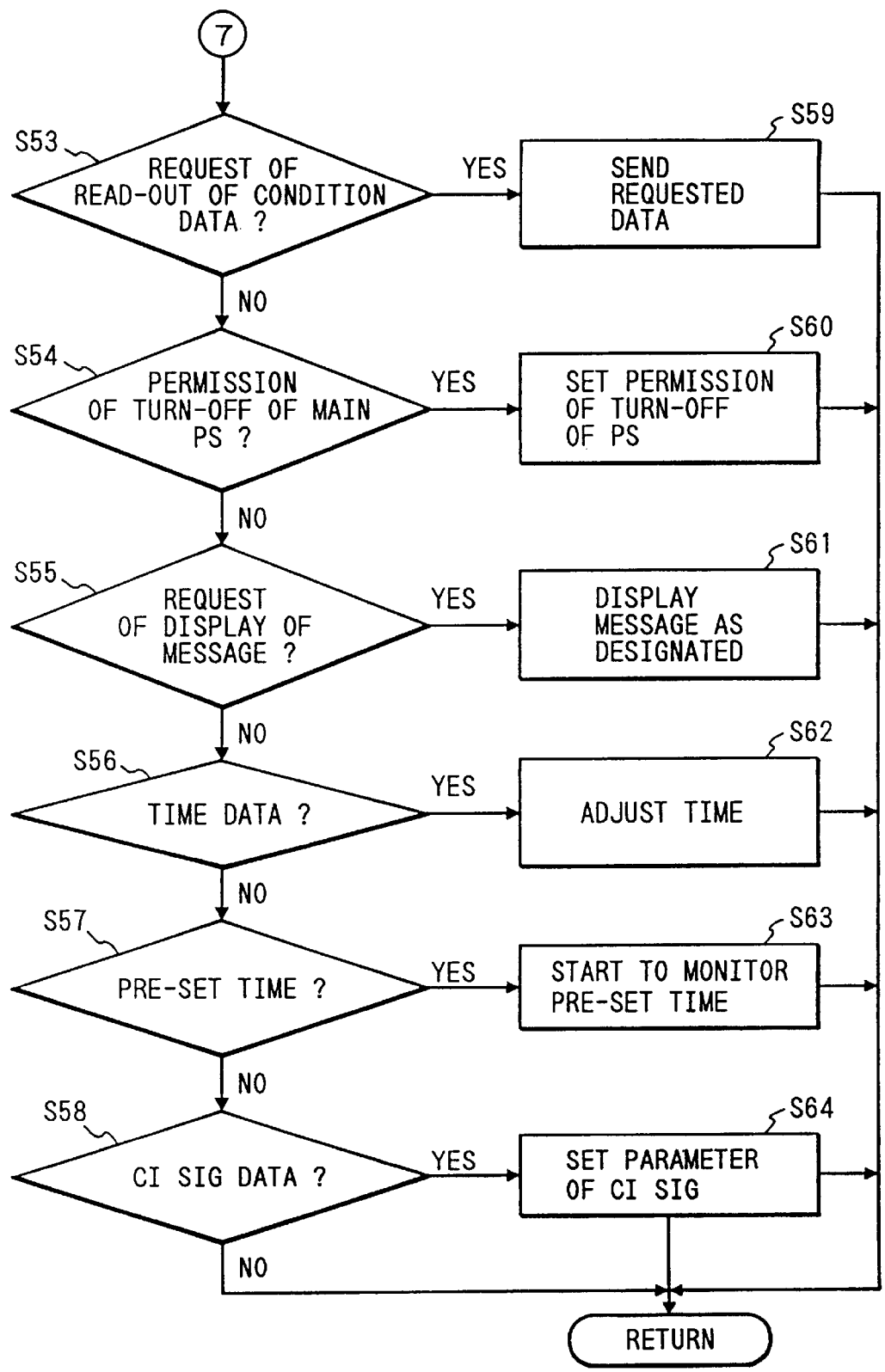
FIG. 12 is a flowchart for the first embodiment.

The reception of data from the first controller 10 in FIG. 12 is performed when the first controller 10 is operated with the main power supply ON. Data that are transmitted from the first controller 10 are requests for reading data concerning the second system (e.g., presence of an original document or various sensors) (step S53); a permission for powering off the main power supply (step S54); data about messages to be displayed (step S55); time (step S56); activation designated time (step S57); and detection parameters for a call signal (step S58). Data that are transmitted from the microcomputer 20 are responses to the above requests for reading data, key information, and cadence information for a detected call signal.

The effects that are obtained in this embodiment are:

(1) For a communication line that shares the DRPD service, the facsimile machine is activated in consonance with the purpose of the service, so that low power consumption can be realized.

(2) Since the facsimile machine is so controlled that it is not activated upon the depression of the original document mode select key and the reception mode select key, which do not always require the activation of the apparatus, the operation of the apparatus can be improved and power consumption can be further reduced.

Second Embodiment

In a facsimile machine according to the first embodiment, since a telephone line and a communication line are connected to each other while on standby, regardless of whether a call signal is for speech communication or for facsimile communication, a telephone set rings during the period a call signal is monitored to determine its cadence. After a call signal is determined to be for facsimile communication, the switching is performed to enable facsimile data reception. As a result, it is not possible to control switch-over from calling based on no-ringing to facsimile reception.

A second embodiment is provided to cope with this. The same reference numbers as are used in the first embodiment are also used to denote components in the second embodiment that correspond to or that are identical with those in the first embodiment, and no explanation of them will be given. Only those components that are different will be explained.

FIG. 13 is a flowchart showing processing after a call signal is detected at step S10 in FIG. 7.

The call signal monitoring process of the second embodiment is shown in FIG. 13.

When a call signal has been detected (step S25), a check is performed to determine whether or not a no-ringing reception faculty is set (step S125).

When the no-ringing reception faculty is set, the main power supply, i.e., a power supply 8, is turned on (step S121). According to the activation of the power supply 8, a first controller 10 begins operation. Since the no-ringing reception faculty is set, a telephone set 53 is temporarily disconnected from the telephone line by a hook relay 57. As the telephone set 53 is temporarily disconnected from the telephone line, the ringing on the telephone set 53 that accompanies the arrival of a call signal is prevented. When a call signal is determined to be for speech communication, the telephone set 53 is connected to the telephone line by the hook relay 57. When a call signal is determined to be for facsimile communication, a communication unit 14 is connected to the telephone line by a hook relay 59.

When the no-ringing reception faculty is not set, the detection of a cadence is begun (step S26).

At step S21, when the power supply 8 was activated under the other conditions for activating the main power supply, the type of the detected call signal is reported to the first controller 10 (step S22). When the power supply 8 is not activated under other conditions for activating the main power supply, the power supply is now activated (step S23), and the type of the detected call signal is reported to the first controller 10 (step S24).

After the type of the detected call signal is transmitted to the first controller 10 (step S22 and step S124), cadence detection is initialized (on-detection flag←0) (steps S70, S71) and program control shifts to step S9 for the control of the first controller 10. When, for example, a call signal is for facsimile, the first controller 10 initiates facsimile reception. When the facsimile reception is completed and the line is disconnected, the completion of the facsimile reception is transmitted from the first controller 10 via the serial interface S-I/O to a microcomputer 20. The microcomputer 20 confirms that the result of the monitoring does not satisfy the condition for activating the main power supply, and sets a PS signal Low to halt the power supply 8.

As is described above, when the state of the apparatus is the standby state, the microcomputer 20 is operated by the secondary battery 30 and halts the power supply 8. Further, when, in the standby state, the result of the monitoring satisfies the condition for activating the main power supply, the microcomputer 20 activates the power supply 8. Therefore, power consumption can be reduced more and operation at a low consumed power can be improved.

In addition, when the no-ringing reception faculty is set during the standby, the power supply 8 is activated substantially at the same time as a call signal is detected, and the telephone set 53 is temporarily disconnected from the telephone line and then the connection is switched. Therefore, the mode for speech communication with which there is no ringing can be changed to the mode for facsimile communication. When, in the standby state, the non-ringing faculty is not set and an incoming call signal for speech communication is detected, the connection of the telephone set 53 to the telephone line is maintained while the power supply 8 is halted. When, in the standby state, the no-ringing reception faculty is not set and an incoming call for facsimile is detected, the second control means activates the main power supply and connects the telephone line so as to enable facsimile reception. Therefore, the operation for a call signal can be performed with lower power consumption.

Although, in this embodiment, the first controller 10 controls the temporary disconnection of the telephone set 53 from the telephone line, the microcomputer 20 may take its place.

Third Embodiment

Figure 14B:
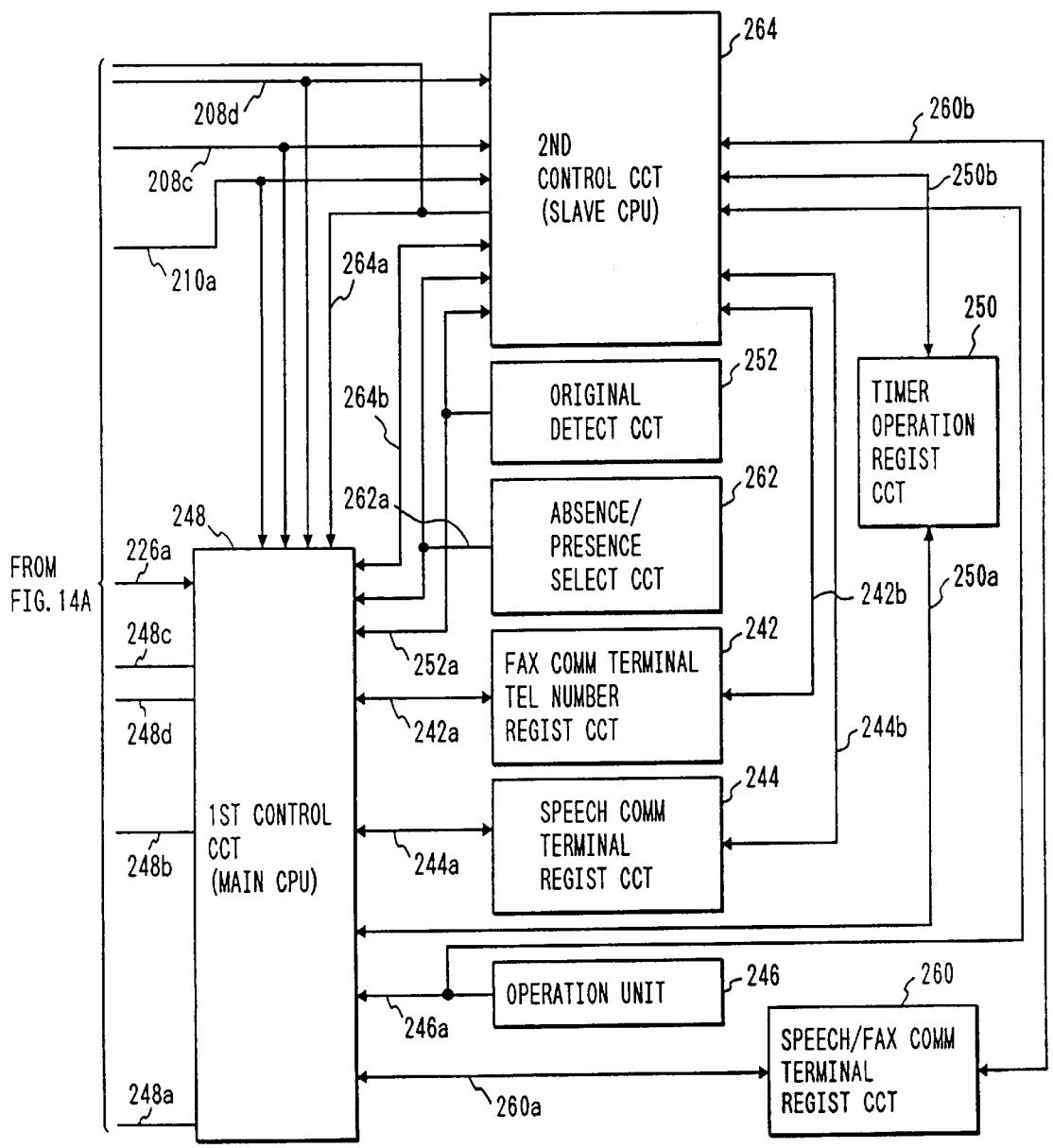
FIG. 14 which is composed of FIGS. 14A and 14B is a diagram illustrating the general arrangement of a facsimile apparatus according to a third through a sixth embodiment of the present invention.

FIGS. 14A and 14B show diagrams illustrating the general arrangement of a facsimile machine according to a third embodiment wherein a telephone set 201 is connected across signal lines 201a and 201b to a connection terminal of the facsimile machine. It should be noted that speech communication is possible through the telephone set 201 without supplying a voltage from an AC power source.

The arrangement of the facsimile machine will now be described in detail while referring to FIGS. 14A and 14B.

A CML relay 202 is in the OFF state when a signal of "0" is output across a signal line 248a. In the OFF state of the CML relay 202, the telephone line is connected to signal lines 202a and 202b, which are connected to signal lines 208a and 208b. The CML relay 202 is turned on when a signal of "1" is output across the signal line 248a, and in this state, the signal lines 202a and 202b are connected to signal lines 214a and 214b.

A call signal detection circuit 208 receives signals across the signal lines 208a and 208b. When a all signal is detected, a signal of "1" is output to a signal line 208b. When a call signal is not detected, a signal of "0" is output across the signal line 208b. The call signal detection circuit 208 outputs a signal of "0" across a signal line 208d when a normal call signal (the first cadence in FIG. 5A) is detected. When double ringing (the second cadence in FIG. 5B) is detected, i.e., a single call signal is found to be separated to form two, the call signal detection circuit 208 outputs a signal of "1" across the signal line 208d.

A telephone number detection circuit 210 detects information for a telephone number that is transmitted from a transmitter's terminal between call signals. Signals that are output across the signal lines 208a and 208b are received and a detected telephone number is output across a signal line 210a.

A hybrid circuit 214 separates a transmission signal and a reception signal. That is, a transmission signal on a signal line 224a is sent across signal lines 214a and 214b through the CML relay 202 to the telephone line. A signal received from a partner is sent through the CML relay 202 and across the signal lines 214a and 214b to a signal line 214c.

A V21 modulator 216 performs modulation based on ITU-T (old CCITT) advisory V21 from the International Telecommunication Unit (ITU). A procedure signal on the signal line 248b is modulated and the modulated data is output across a signal line 216a.

A reader circuit 218 includes an image sensor, such as a CCD (charge-coupled device), and an optical system. An image signal for one line in the main scan direction is sequentially read from an original document that is to be transmitted, and a signal row that represents binary values for white and black is prepared and is output across a signal line 218a.

Upon the receipt of the binarized signal row across the signal line 218a, an encoding circuit 220 performs a predetermined encoding process (MH coding or MR coding) for the received signal row, and outputs resultant coded data across a signal line 220a.

A V27ter or V29 modulator 222 receives the signal across the signal line 220a, and modulates the signal based on ITU-T advisory V27ter (differential phase modulation) or V29 (quadrature modulation). The resultant data are output across a signal line 222a.

An adder circuit 224 adds together the signals received across the signal lines 216a and 222a, and outputs the result across a signal line 224a.

A V21 demodulator 226 demodulates a signal received across the signal line 214c based on the known ITU-T advisory V21, and outputs the demodulated data across a signal line 226a.

Upon the receipt of the signal across the signal line 214c, a V27ter or V29 demodulator 228 demodulates the signal based on the ITU-T advisory V27ter (differential phase modulation) or V29 (quadrature modulation), and outputs the demodulated data across a signal line 228a.

When a decoding circuit 230 receives a signal across a signal line 228a, it performs a predetermined decoding process (MH decoding or MR decoding) on the signal, and outputs the decoded data across a signal line 230a.

A recording circuit 232 receives the decoded data across the signal line 230a and sequentially records the data for each line.

A fax communication terminal telephone number register circuit (hereafter referred to as a "first register circuit") 242 registers information concerning the telephone number of a partner, which identifies a communication terminal such as a fax communication terminal, that is transmitted across a signal line 242a. The information is transmitted across the signal lines 242a and 242b to a first control circuit (main CPU) 248 and a second control circuit (slave CPU) 264, respectively.

A speech communication terminal telephone number register circuit (hereafter referred to as a "second register circuit") 244 information concerning the telephone number of a partner, which identifies a speech communication terminal, that is transmitted across a signal line 244a. The information is transmitted across the signal lines 244a and 244b to the first control circuit (main CPU) 248 and the second control circuit (slave CPU) 264, respectively.

An operation unit 246 includes a button for registering a telephone number in the first register circuit 242; a button for registering a telephone number in the second register circuit 244; a button for registering a terminal attribute that corresponds to a call signal in a speech/fax communication terminal register circuit (hereafter referred to as a "third register circuit") 260; one touch dialing buttons; speed dialing buttons; a start button; and buttons for number keys, timer transmission, timer reception, etc. The information concerning a depressed button is transmitted across a signal line 246a.

A timer operation register circuit 250 registers a predetermined timer operation that is transmitted across a signal line 250a or 250b. The information to be registered is transmitted across the signal lines 250a and 250b from the main CPU 248 and the slave CPU 264, respectively.

An original document detection circuit 252 detects whether or not an original document is placed on a document table (not shown). When an original document is mounted on the document table, the original document detection circuit 252 sends a signal of "1" across a signal line 252a. When an original document is not located on the document table, the original document detector 252 outputs a signal of "0" across the signal line 252a.

An auto answer/record phone 254 performs predetermined recording and reproduction under the control of signals that are transmitted across a signal line 248c. That is, for recording, signals across the signal lines 208a and 208b are received and recorded, and for reproduction, speech information is output across signal lines 254a and 254b and through a loudspeaker 255. When a signal of "1" is sent across a signal line 248d, reproduced speech is output through the loudspeaker 255. When a signal of "0" is sent across the signal line 248d, the output is cut off.

The third register circuit 260 decides, in consonance with the pattern of a call signal, whether a sender is a speech communication terminal or a fax communication terminal, and registers the result. As a ringing pattern, for example, there are a normal call signal and a double ringing call signal. The third register circuit 260 registers these call signals from the main CPU 248 and the slave CPU 264 that are received across signal lines 260a and 260b, respectively. Information that is registered in the third register circuit 260 is transmitted to the main CPU 248 and to the slave CPU 264.

An absence/presence select circuit 262 selects either a personal absence or presence, and transmits the selected information across a signal line 262a. When an absence is selected, a signal of "0" is output across the signal line 262a. When a presence is selected, a signal of "1" is output across the signal line 262a.

Reference number 256 denotes an AC power plug. A power supply 258 furnishes only standby power when a signal of "0" is output across the signal line 264a, and does not supply the main operating power. In other words, as the standby power in this case, merely a voltage of 5V is applied between a 5 VS and a GND. When a signal of "1" is output across the signal line 264a, the power supply 258 supplies the main operating power, not the standby power. In other words, as the main operating power in this case, a voltage of 5V is applied between a 5 VM and a GND, a voltage of +12V is applied between a 12 VM and a GND and a voltage of −12V is applied between −12 VM and a GND. The standby power is not supplied. It should be noted that the standby power is supplied to the CML relay 202, the call signal detector 208, the telephone number detection circuit 210, the first register circuit 242, the second register circuit 244, the operation unit 246, the timer operation register circuit 250, the original document detection circuit 252, the third register circuit 260, the absence/presence select circuit 262, and the slave CPU 264, and that the main operating power is supplied to all the circuit blocks.

The control procedures for the main CPU 248 and the slave CPU 264 will now be explained.

Figure 16:
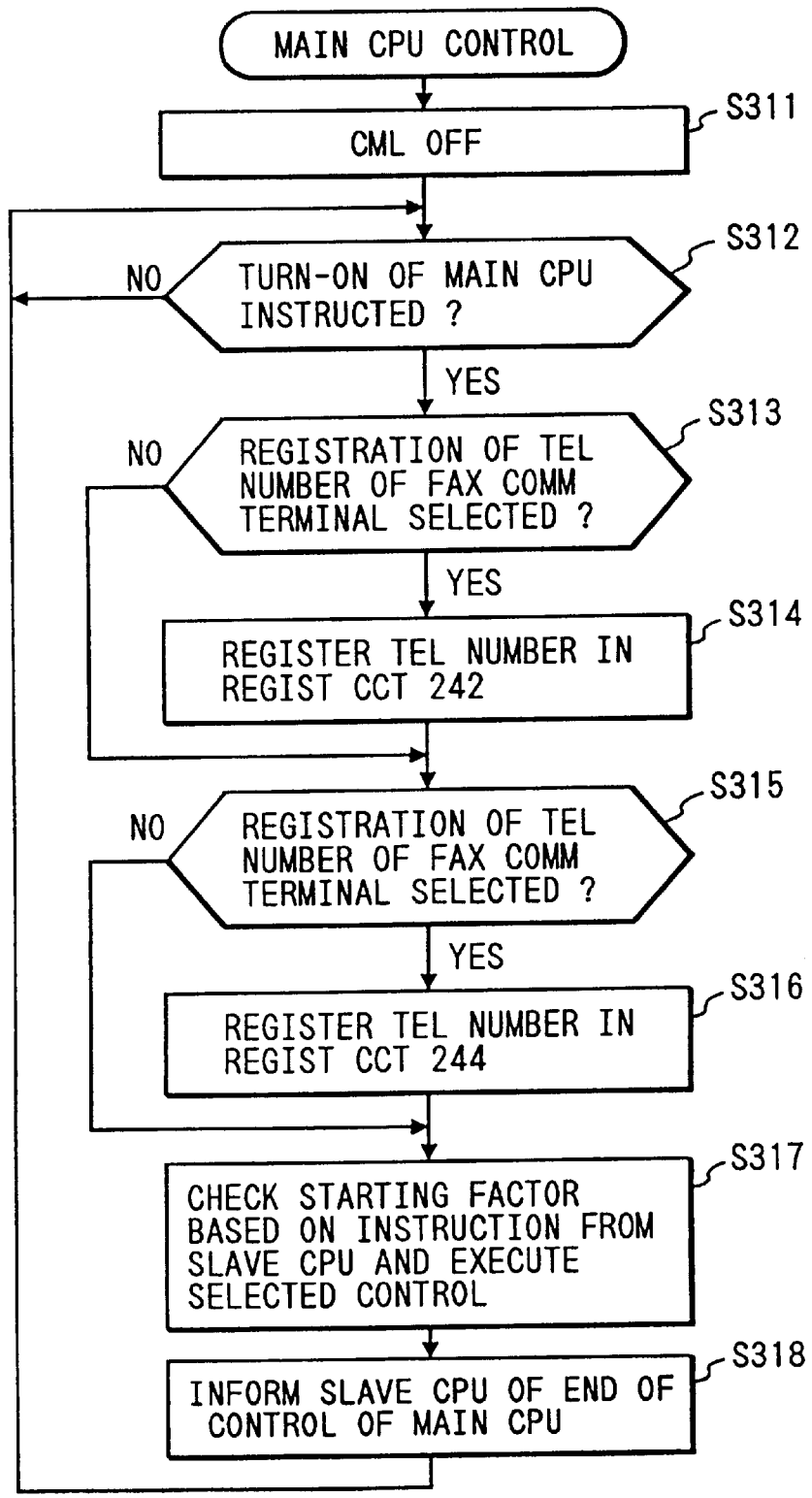
FIG. 16 is a flowchart of the control procedures that are performed by a main CPU in the third embodiment.

FIGS. 15 and 16 are flowcharts showing the processing performed by the slave CPU 264 and the main CPU 248 in the third embodiment. The control procedures shown in the flowcharts are for when the auto answer/record telephone set 254, the loudspeaker 255, the third register circuit 260, and the absence/presence select circuit 262 are not included.

In the control procedures for the slave CPU 264, as is shown in FIG. 15, first, at step S301 a signal of "0" is output across the signal line 264a, and the power supply 258 turns off the main power supply and the main CPU 248 and turns on the standby power supply. In other words, the apparatus is placed in the energy-saving state while on standby (hereafter referred to as a "standby state").

The procedures for examining a factor for activation are performed at steps S302 through S306. At step S302, a check is performed to determine whether or not a key has been depressed in response to information from the operation unit 246 that is transmitted across the signal line 246a. When no keys have been depressed, program control advances to step S303, where the information from the original document detection circuit 252 that is transmitted across the signal line 252a is examined to determine whether or not an original document has been placed on an original document table. When there is no original document on the original document table, program control advances to step S304, where the information from the timer operation register circuit 250 that is transmitted across the signal line 250b is examined to determine whether or not it is time to initiate the timer operation. When it is not time to start, program control moves to step S305, where the information from the call signal detection circuit 208 that is transmitted across the signal line 208c is examined to determine whether or not a call signal has been detected. When no call signal has been detected, program control goes to step S306. A telephone number that is output from the telephone number detection circuit 210 between the call signals is received across the signal line 210a, and the information on the signal line 210a is examined. Also, a signal that is transmitted across the signal line 242b is received, and a check is performed to determine whether or not the telephone number at the partner terminal identifies a fax communication terminal. When the partner terminal is not a fax communication terminal, program control returns to step S302.

When one of the decisions at steps S302 through S304 and S306 is affirmative (YES), i.e., when a key has been depressed, when an original document has been placed on the original document table, when it is the start time for a timer, or when the partner terminal is a data communication terminal, program control goes to step S307, where a signal of "1" is output across the signal line 264a to turn on the main power supply in the power supply 258 and to turn on the main CPU 248. At this time, the standby power supply is turned off. More specifically, since the main CPU 248 is now activated, the supply of standby power is not necessary, and the standby power supply is turned off to save energy. Therefore, as long as the partner is a speech communication terminal, even if a call signal is detected, the main power supply is in the OFF state, which contributes to energy saving and to an improvement in the durability of the apparatus.

At step S308, the slave CPU 264 informs the main CPU 248 across the signal line 264b of an activation factor, more specifically, of the factor at which step that causes the activation.

At step S309, the slave CPU 264 determines by means of the signal line 264b whether or not the control of the main CPU 248 has been terminated. When the control of the main CPU 248 has been terminated, program control returns to step S301 and the above described process is repeated.

In the control procedures performed by the main CPU 248, as is shown in FIG. 16, at step S311 a signal of "0" is output across the signal line 248a, and the CML relay 202 is set to OFF. At step S312, information from the slave CPU 264 is received across the signal line 264a, and a check is performed to determine whether or not the information instructs the turning on of the main CPU 248. More specifically, the state of the signal line 264a is examined. When an ON signal is not detected while a signal of "0" is output on the signal line 264a, program control waits until the ON signal is detected. When an ON signal is detected while the level of a signal across the signal line 264a is "1", program control moves to step S313.

At step S313, the information from the operation unit 246 is received across the signal line 246a, and a check is performed to determine whether or not the registration for "a telephone number for which the calling terminal identifies a fax communication terminal", is selected. When such a registration is selected, program control advances to step S314 and the telephone number is registered in the first register circuit 242. In the registration process, upon the depression of the button for registering a telephone number in the first register circuit 242, the mode is shifted to a registration mode for "a telephone number for which the calling terminal identifies a fax communication terminal". Then, a desired telephone number is input by using number keys. The main CPU 248 registers the input telephone number as "a telephone number for which the calling terminal identifies a fax communication terminal" in the first register circuit 242.

When the registration is not selected, program control goes to step S315. The information across the signal line 246a is received, and a check is then performed to determine whether or not the registration of "a telephone number for which the calling terminal identifies a speech terminal" is selected. When the registration is selected, program control advances to step S316, where the telephone number is registered in the second register circuit 244. In this registration process, upon the depression of the button for registering a telephone number in the second register circuit 244, the mode is shifted to a registration mode of "a telephone number for which the calling terminal identifies a speech communication terminal". Then, a desired telephone number is input by using number keys. The main CPU 248 registers the input telephone number as "a telephone number for which the calling terminal identifies a speech communication terminal" in the second register circuit 244.

When the registration is not selected, program control moves to step S317. Upon the receipt of the information across the signal line 264b, an activation factor is examined in detail according to the instruction of the slave CPU 264, and the selected control is performed.

At step S318, information that the control of the main CPU 248 has been terminated is transmitted to the slave CPU 264 across the signal line 264b. Program control returns to step S312 and the above described process is repeated.

Fourth Embodiment

Figure 17:
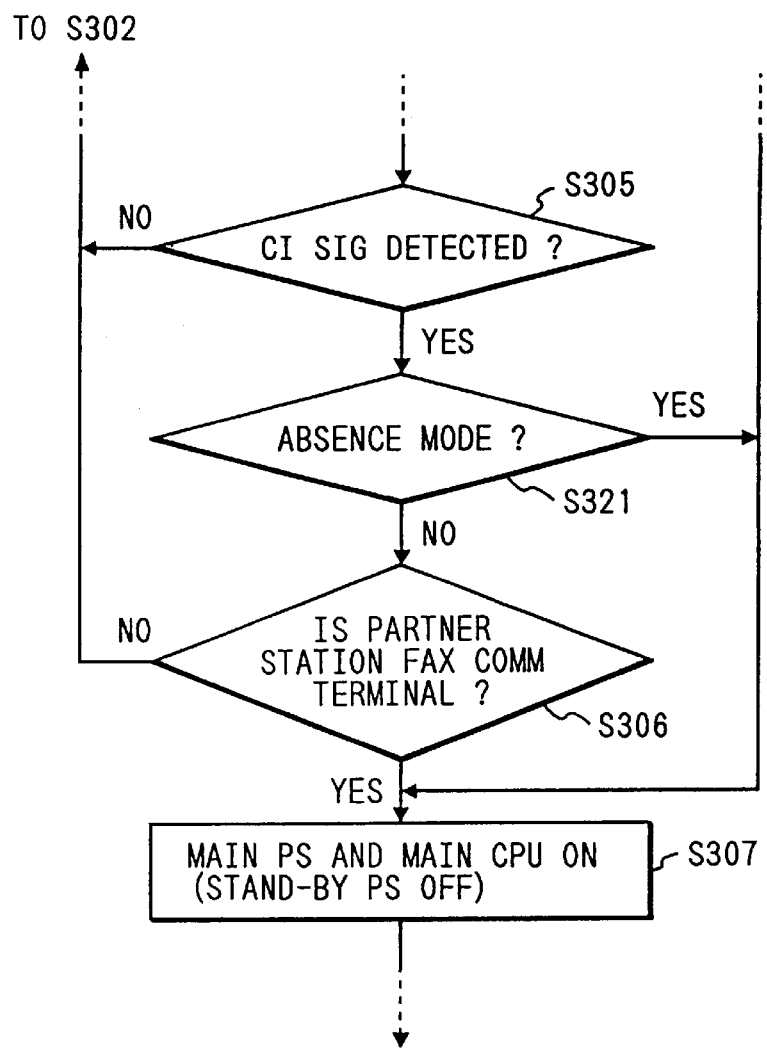
FIG. 17 is a detailed flowchart of the control procedures that are performed by a slave CPU in the fourth embodiment.
Figure 18:
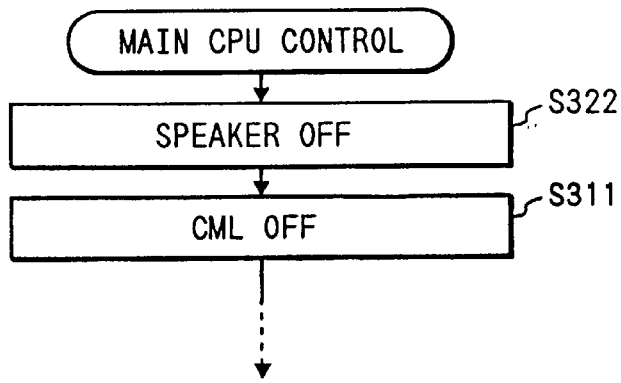
FIG. 18 is a detailed flowchart of the control procedures that are performed by a main CPU in the fourth embodiment.

FIGS. 17 and 18 are flowcharts for the essential portions in a fourth embodiment. The flowcharts show the control procedures for a facsimile machine in the fourth embodiment that incorporates an auto answer/recording function and has an absence/presence select circuit 262. In this embodiment, only components that differ from those in the third embodiment will be explained. For the other components, the same reference numbers as are used in third embodiment are also used to denote them and no explanation of them will be given.

As is shown in FIG. 17, at step S305, in the same manner as in the third embodiment, a slave CPU 264 determines whether or not a call signal has been detected. When a call signal has not been detected, program control returns to step S302. When a call signal has been detected, program control advances to step S321. The information from the absence/presence select circuit 262 that is transmitted across the signal line 262a is received, and a check is performed by referring to the information to determine whether or not the mode of the apparatus is an absence mode. When the level of the signal across the signal line 262a is set to "1" and the apparatus is in a presence mode, program control advances to step S306. When the level of that signal is set to "0" and the apparatus is in the absence mode, the main power supply and a main CPU 248 are turned on, and answering and recording is performed regardless of whether the calling terminal is a speech communication terminal. At this time, as in the third embodiment, the standby power supply is turned off so as to save energy.

As is shown in FIG. 18, the main CPU 248 outputs a signal of "0" across a signal line 248d, and turns off a loudspeaker 255 (step S322). Then, the CML relay is turned off (step S311). Thereafter, the main CPU 248 executes the same process as is performed at step S312 and the following steps in FIG. 16 for the third embodiment.

Fifth Embodiment

Figure 19:
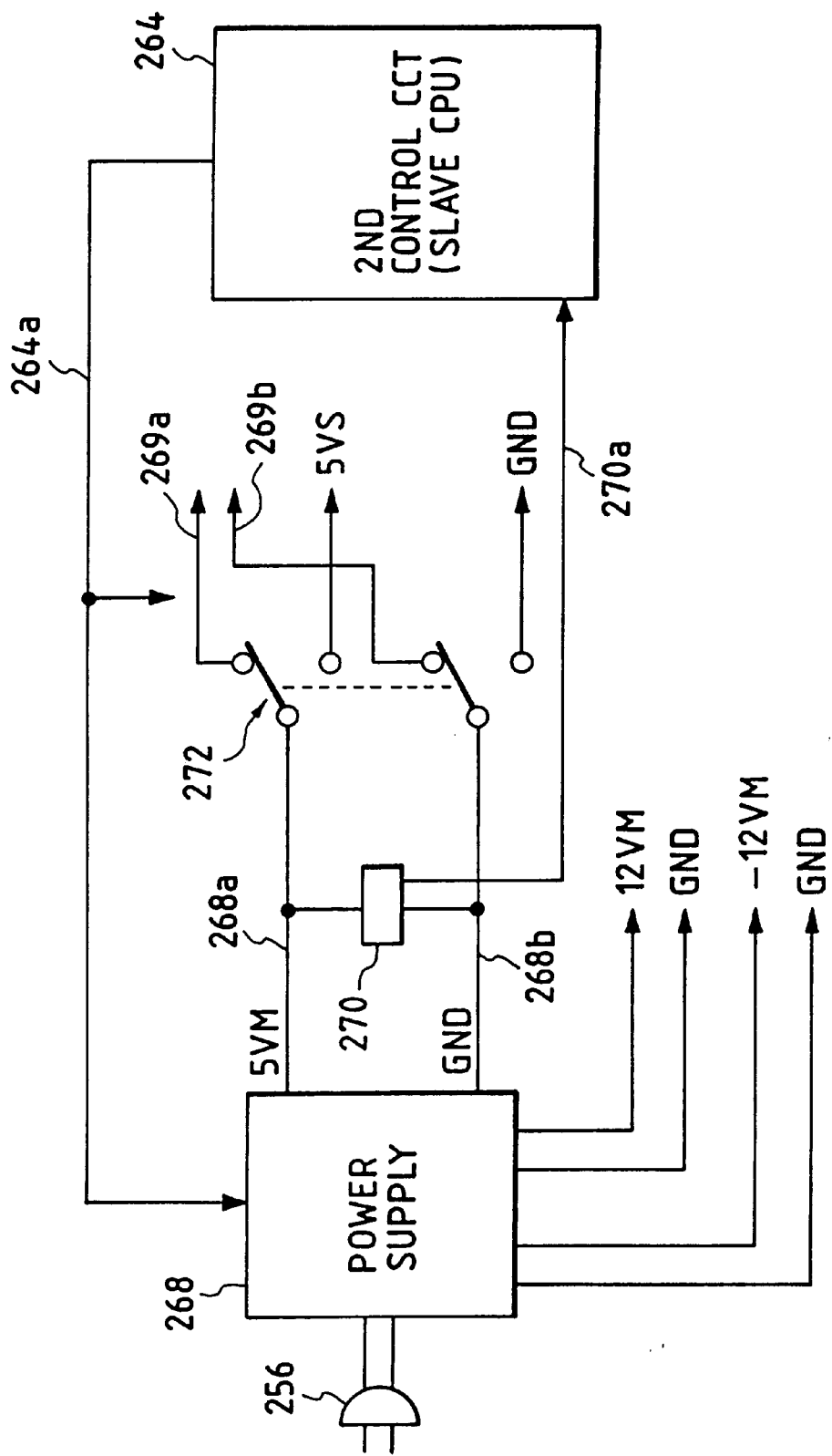
FIG. 19 is a block diagram illustrating the arrangement of the essential portion in the fifth embodiment.

FIG. 19 is a block circuit diagram illustrating the essential section according to a fifth embodiment. In the fifth embodiment, a facsimile machine incorporates a secondary battery in addition to the arrangement in the third embodiment. In the standby state, the factor for activating a main power supply is examined by using a power supply that has been charged in the operational state, and the operation of the switching power supply is halted. In this embodiment, only the section that differs from those in the third embodiment will be explained. For the other sections, the same reference numbers as are used in the third embodiment are also used to denote them, and no explanation for them will be given.

When a signal of "1" is output across a signal line 264a, a power supply 268 begins to operate as a switching power supply. The power supply 268 applies a voltage of 5V between 5 VM and its corresponding GND, a voltage of +12V between 12 VM and its corresponding GND, and a voltage of −12V between −12 VM and its corresponding GND. When a signal of "0" is output across the signal line 264a, the operation of the switching power supply is halted, and no power is supplied between 5 VM and its corresponding GND, between 12 VM and its corresponding GND, and between −12 VM and its corresponding GND. Further, a secondary battery 270 is connected between 5 VM and its corresponding GND. During the operation of the switching power supply, the secondary battery 270 is charged. In the standby state, a voltage is supplied from the secondary battery 270 to the slave CPU 264, which examines the various activation factors and halts the operation of the switching power supply. That is, when the operation of the switching power supply is halted, a relay 272 is maintained off and 5 VM and its corresponding GND are connected to 5 VS and its corresponding GND, respectively. When the switching power supply is operated, the relay 272 is turned on to charge the secondary battery 270, which in turn outputs power across a signal line 270a.

Figure 20:
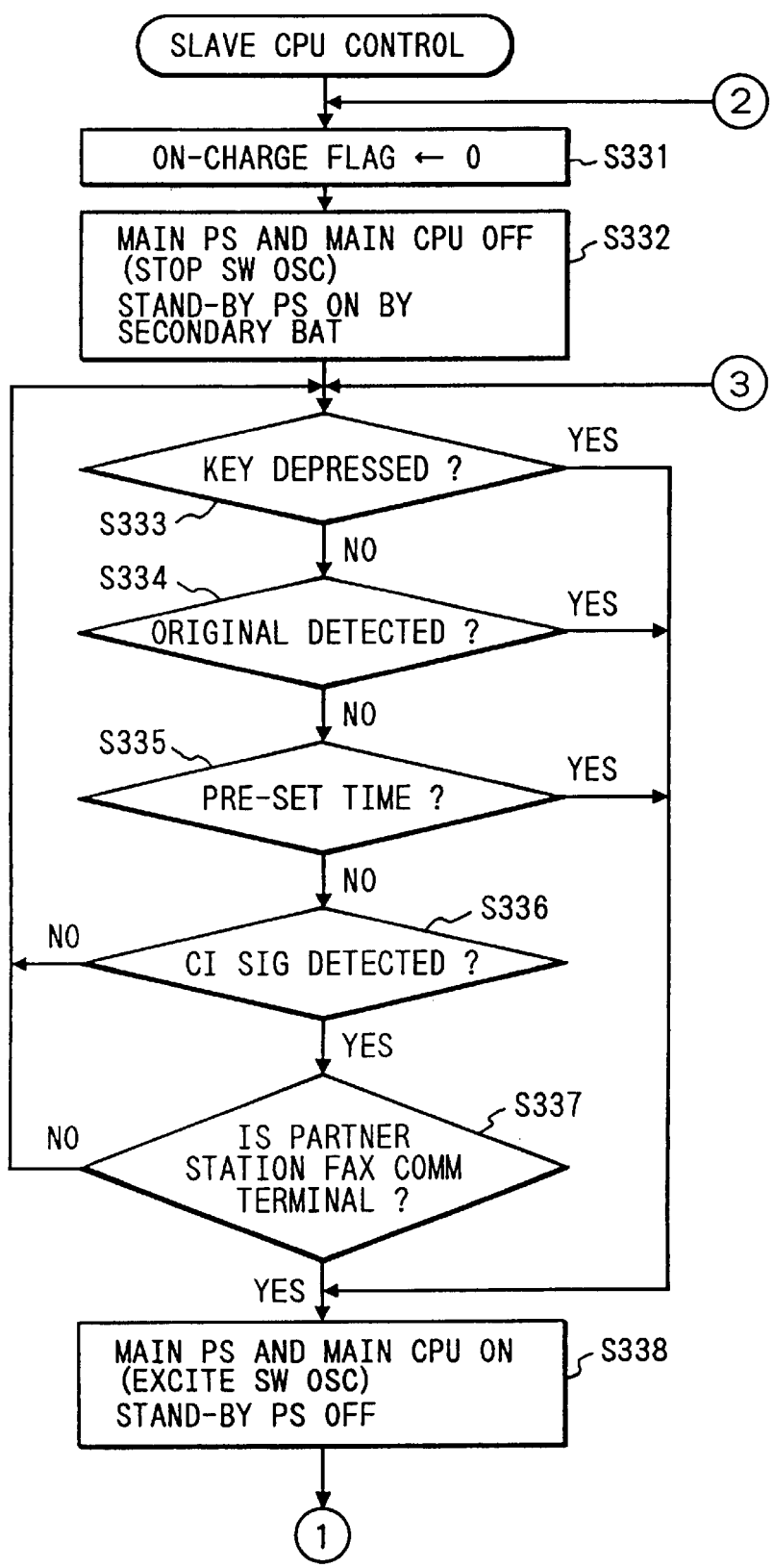
FIG. 20 is a flowchart of the control procedures performed by a slave CPU in the fifth embodiment.
Figure 21:
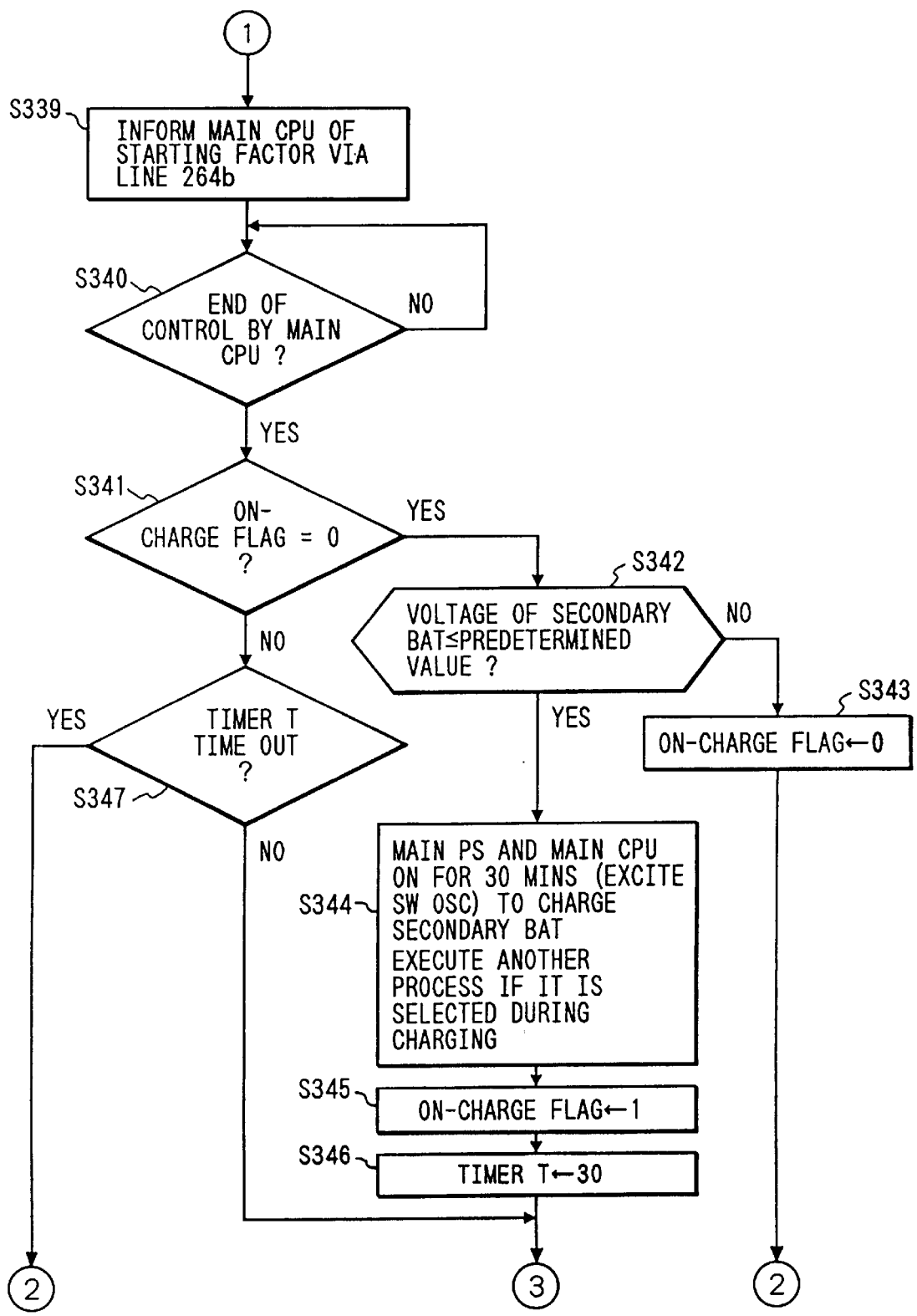
FIG. 21 is a flowchart of the control procedures that are performed by the slave CPU in the fifth embodiment.

FIG. 20 is a flowchart showing the control procedures for the slave CPU 264 in the fifth embodiment.

At step S331, an on-charge flag indicating that the secondary battery 270 is being charged is set to "0". At step S332, a signal of "0" is output across the signal line 264a, the power supply halts the switching and is turned off, and the main CPU 248 is also turned off. At this time, the standby power supply is placed in the ON state by the secondary battery 270.

At steps S333 through S337, as in steps S302 through S306 in the third embodiment, the factor for activation is examined. More specifically, at step S333, a check is performed to determine whether or not a key has been depressed. When no key has been depressed, at step S334 a check is performed to determine whether or not an original document is present. When an original document is not present, at step S335 a check is performed to determine whether or not it is time to start the timer operation. If it is not yet the start time, at step S336, a check is performed to determine whether or not a call signal is detected. When no call signal is detected, program control returns to step S333. When a call signal is detected, at step S337 a check is performed to determine whether or not a calling terminal is a data communication terminal. When the terminal is not a data communication terminal, program control returns to step S333.

If one of the decisions at steps S333 through S335 and S337 is affirmative (YES), at step S338 a signal of "1" is output across the signal line 264a, and the power supply performs switching to turn on both the main power supply and the main CPU 248. At this time, the standby power supply is turned off by the relay 272.

At step S339, the factor for activation is reported to the main CPU 248 across the signal line 264b. At step S340, a check is performed across the signal line 264b to determine whether or not the control of the main CPU 248 has been terminated. When the control of the main CPU 248 has been terminated, program control advances to step S341.

At step S341, a check is performed to determine whether or not an on-charge flag is "0", i.e., whether or not the secondary battery 270 is being charged. When the secondary battery 270 is not being charged, at step S342 information is received across the signal line 270a and a voltage of the secondary battery 270 is examined. When the voltage of the secondary battery 270 is higher than a predetermined value, program control returns to step S331 (in FIG. 20). When the voltage is equal to or below the predetermined value, at step S344 the charging of the secondary battery 270 is begun. At step S345, the on-charge flag is set to "1" and the charge timer T is set at 30 minutes (step S346). Program control then returns to step S333 (in FIG. 20). In other words, during the 30-minute charging of the secondary battery, if another operation is selected, that operation is performed. The standby power supply is turned off by the relay 272.

When in the following loop the decision at step S341 is negative (NO), a check is performed to determine whether or not the charge timer T has been counting for a time that is longer than 30 minutes and whether or not the time period has expired (step S347). When the time period for the timer T has not expired, program control returns to step S333 (in FIG. 20). When the time period for the timer T has expired, program control returns to step S331 (in FIG. 20) and the same process is repeated.

Sixth Embodiment

In the third through the fifth embodiments, a telephone number of a fax communication terminal or a speech communication terminal is registered in advance in the first register circuit 242 and the second register circuit 244, and information concerning the telephone number of a calling terminal is employed to determine whether or not the calling terminal is a speech communication terminal or a fax communication terminal. In a sixth embodiment, however, the information about whether the calling terminal is a speech communication terminal or a fax communication terminal is registered in a third register circuit 260, and according to the registered information, a check is performed to determine whether a calling terminal is a fax communication terminal or a speech communication terminal.

In this embodiment, at step S306 of the control process for the slave CPU 264 in FIG. 15, the pattern of a call signal output across the signal line 308d is employed to determine whether or not a partner is a fax communication terminal. For example, with pattern 1, a calling terminal is determined to be a fax communication terminal, and with pattern 0, the calling terminal is determined to be a speech communication terminal. Thus, when the partner is a fax communication terminal, the pattern of a call signal is pattern 1.

Figure 22:
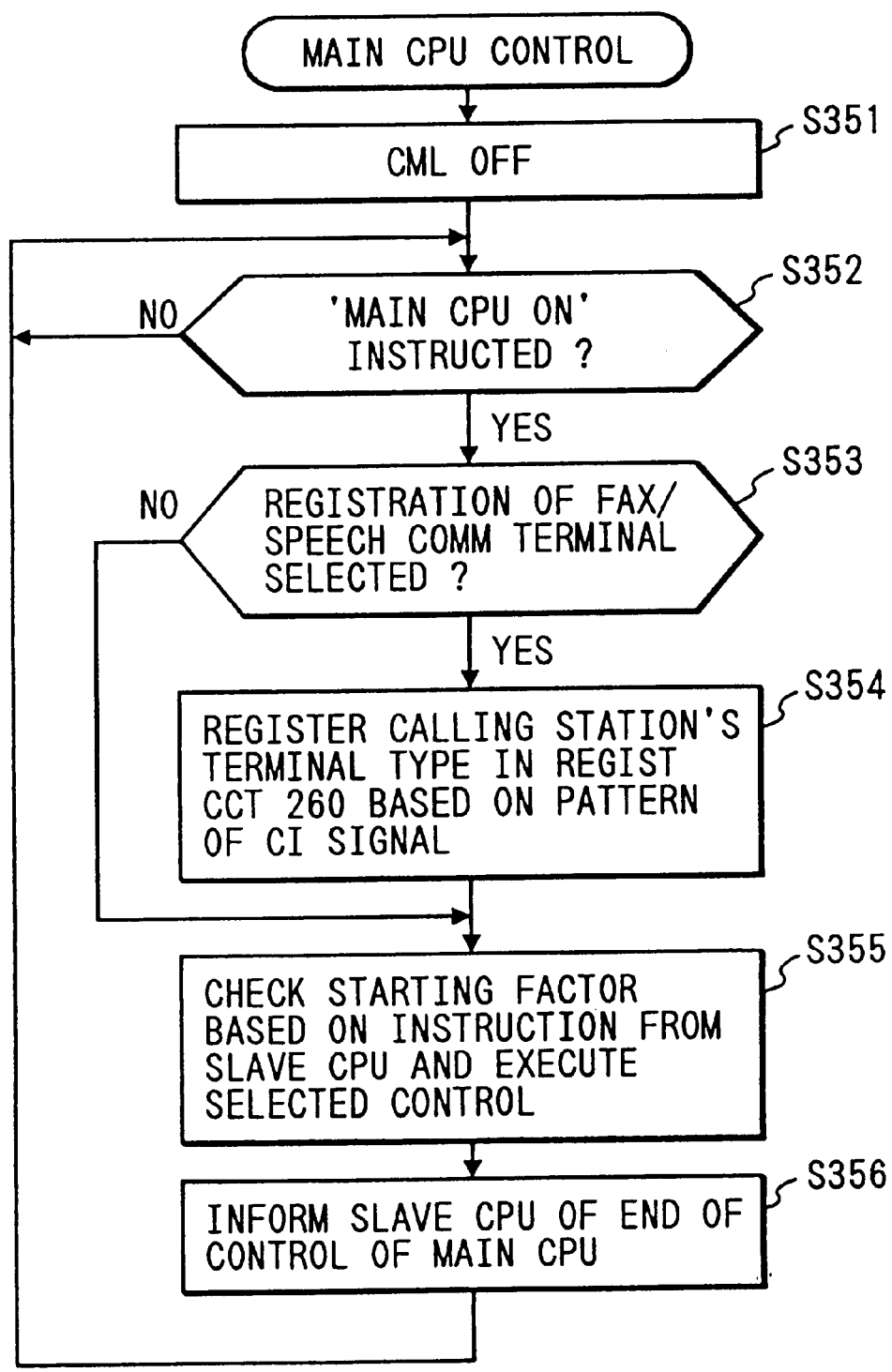
FIG. 22 is a detailed flowchart of the control procedures that are performed by a main CPU in the sixth embodiment.

For the control of a main CPU 248, as is shown in FIG. 22, a CML relay 202 is turned off (step S351). Following this, when at step S352 an ON instruction is issued to the main CPU 248, program control advances to step S353. Upon the receipt of the information across the signal line 246a, the pattern of a call signal is employed to determine whether or not the registration process for ascertaining whether the calling terminal desires fax communication or speech communication is selected. When the registration process for fax communication or speech communication is not selected, program control moves to step S355. When the registration is selected, program control advances to step S354. In consonance with the pattern of a call signal, the information as to whether a request from the calling terminal is speech communication or fax communication is registered in the third register circuit 260 across the signal line 260a. More specifically, a call signal for pattern 0 is registered as a speech communication terminal, while a call signal for pattern 1 is registered as a fax communication terminal.

Then, at step S355, the information is received across the signal line 264b. According to an instruction from the slave CPU 264, a factor for activation is examined in detail and a selected control process is performed.

At step S356, the information that the control of the main CPU 248 has been terminated is reported to the slave CPU 264. Program control returns to step S352 and the above described process is repeated.

As is described above in detail, according to the third through the sixth embodiments, when a calling terminal is determined to be a speech communication terminal as the result of the detection of a call signal or a telephone number between call signals, the main power supply need not be turned on. Therefore, energy can be saved and the durability of the machine can be improved.

According to the sixth embodiment, the pattern of a call signal is employed to determine whether a calling terminal is a speech communication terminal or a fax communication terminal, and according to this determination, the main power supply can be turned on or off when a call signal is detected. Therefore, energy can be saved and the service life of the apparatus can be extended.

According to the fourth embodiment, when an auto answer/recording function is incorporated, the identification of a calling terminal does not unnecessarily turn on the main power supply in the presence mode even if a call signal is detected. Energy can be saved and the durability of the apparatus can be improved.

According to the fifth embodiment, the condition for turning on the main power supply is detected by using the secondary battery and the generation by the switching power supply is halted. In the standby state, therefore, a call signal and a telephone number between the call signals can be detected even when the generation by the switching power supply is halted. Further, the main power supply can be turned on or off by using the secondary battery, and the generation by the switching power supply is not unnecessarily employed. Thus, energy saving is possible and the service life of the apparatus can be further extended.

Seventh Embodiment

A seventh embodiment of the present invention will now be described in detail.

Figure 23:
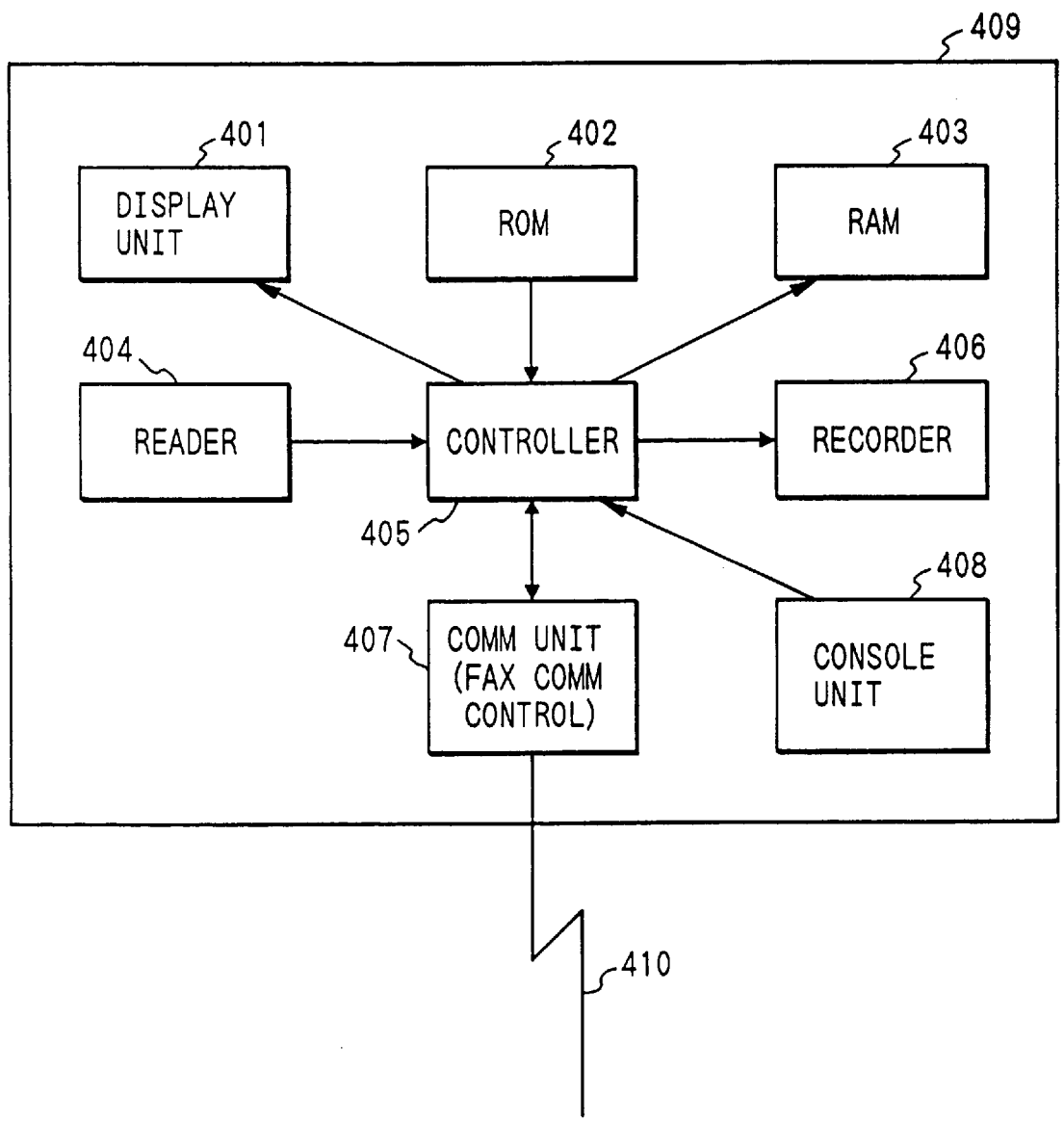
FIG. 23 is a block diagram for the seventh and the eighth embodiments.

FIG. 23 is a schematic block diagram illustrating the arrangement of a facsimile machine that has an energy saving mode according to the seventh embodiment. A display 401 displays the state of the apparatus, a telephone number of a partner who originates a call, and time information.

A ROM (Read Only Memory) 402 is constituted by a microprocessor device, etc., and in the ROM 402 are stored a program for controlling a controller 405 and operator messages.

In a RAM (Random Access Memory) 403 are stored data that can be set by an operator.

A reader 404 reads an original document. The controller 405 controls the entire system, and executes control processing according to a control program that is stored in the ROM 402.

A recorder 406 records an image described by an image signal.

A communication unit 407 employs image data as a format for communication.

A console unit 408 is employed to input operation commands for the apparatus and various information, and includes a plurality of key input switches and an operational circuit for key input switches.

Reference number 409 denotes a facsimile machine and 410 denotes a data communication line.

Figure 24:
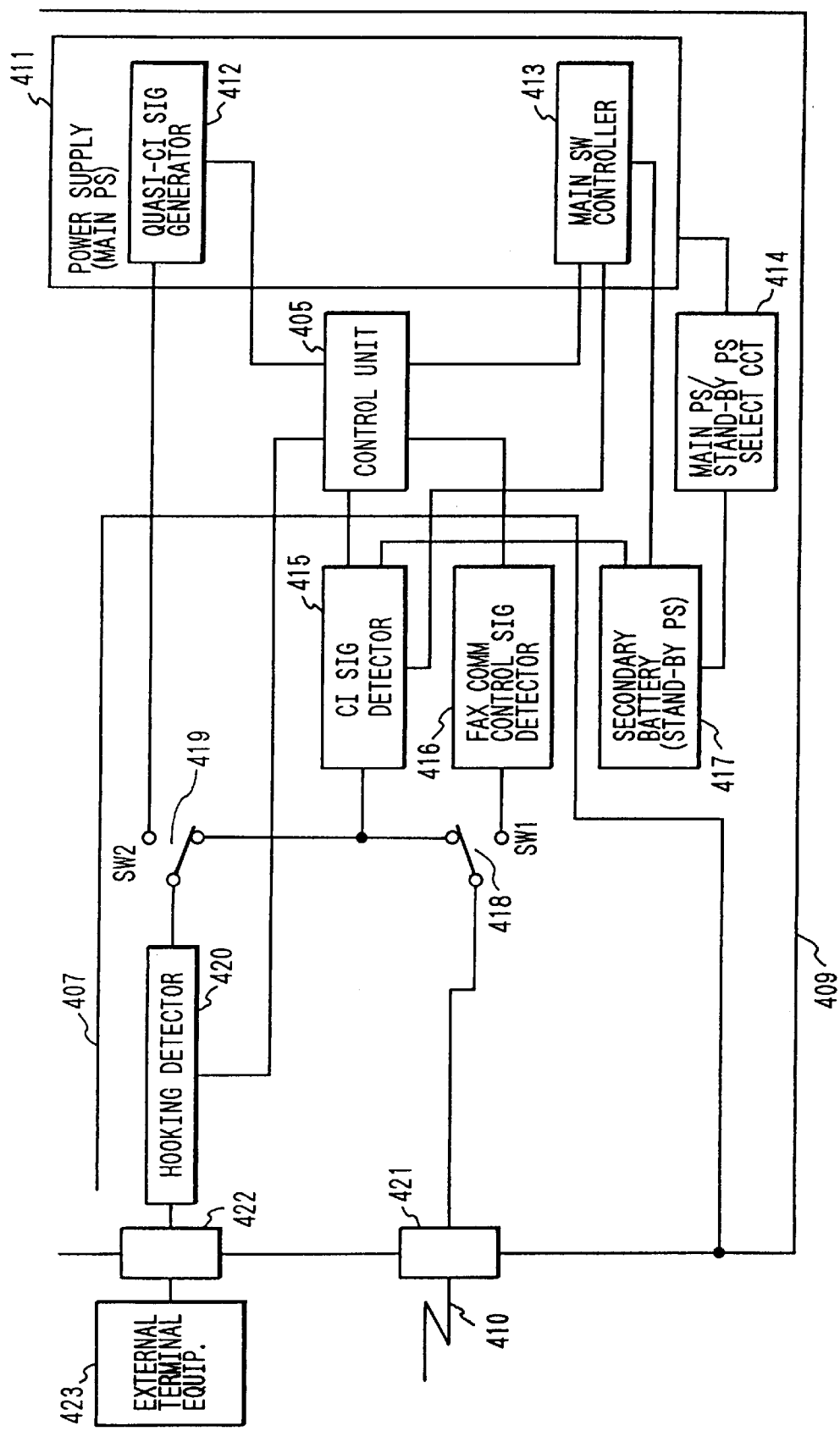
FIG. 24 is a block diagram illustrating the seventh embodiment.

FIG. 24 is a diagram illustrating an internal circuit of the communication unit 407 and a power supply switching circuit for the energy saving facsimile machine. A power supply 411 converts a voltage that is supplied by an AC power supply into a voltage for use in the apparatus. A pseudo CI generator 412 generates a pseudo call signal in order to call up an external terminal 423, such as an extension set, that is connected to a facsimile machine at the time of the FAX/TEL switching. A main SW controller 413 selects, in the power supply 411, a normal AC power supply or a secondary battery for operating a facsimile machine in an energy saving mode. A primary/secondary power supply switching circuit 414 switches an AC power supply and a secondary battery 417 for the supply of power in the apparatus. A CI detector 415 detects call signals (CI signals) that are transmitted across the data communication line 410 while it is operated by the secondary battery 417. A facsimile communication control signal detector 416 detects a facsimile procedure signal that is received after the data communication line is locked on to. The secondary battery 417 supplies a voltage for activating the facsimile machine in the energy saving mode. A SW1 418 is a CML relay that selects the facsimile apparatus or an external terminal 423 to lock on to the data communication line. A SW2 419 is an H relay that employs a pseudo call signal transmitted from the pseudo CI generator 412 in order to call up the external terminal 423 when, in the FAX/TEL switching mode, the facsimile communication control signal detector 416 can not detect a facsimile procedure signal (including the state wherein there is no sound transmitted across the data communication line 410 for a predetermined time). A hooking detector 420 determines whether or not the external terminal 423 is in the off-hook state. A communication line connector 421 connects the communication line 410 to the facsimile machine. An external terminal connector 422 connects the external terminal 423 to the facsimile machine. The external terminal 423 is, for example, a telephone set that is connected to the facsimile machine.

Figure 25:
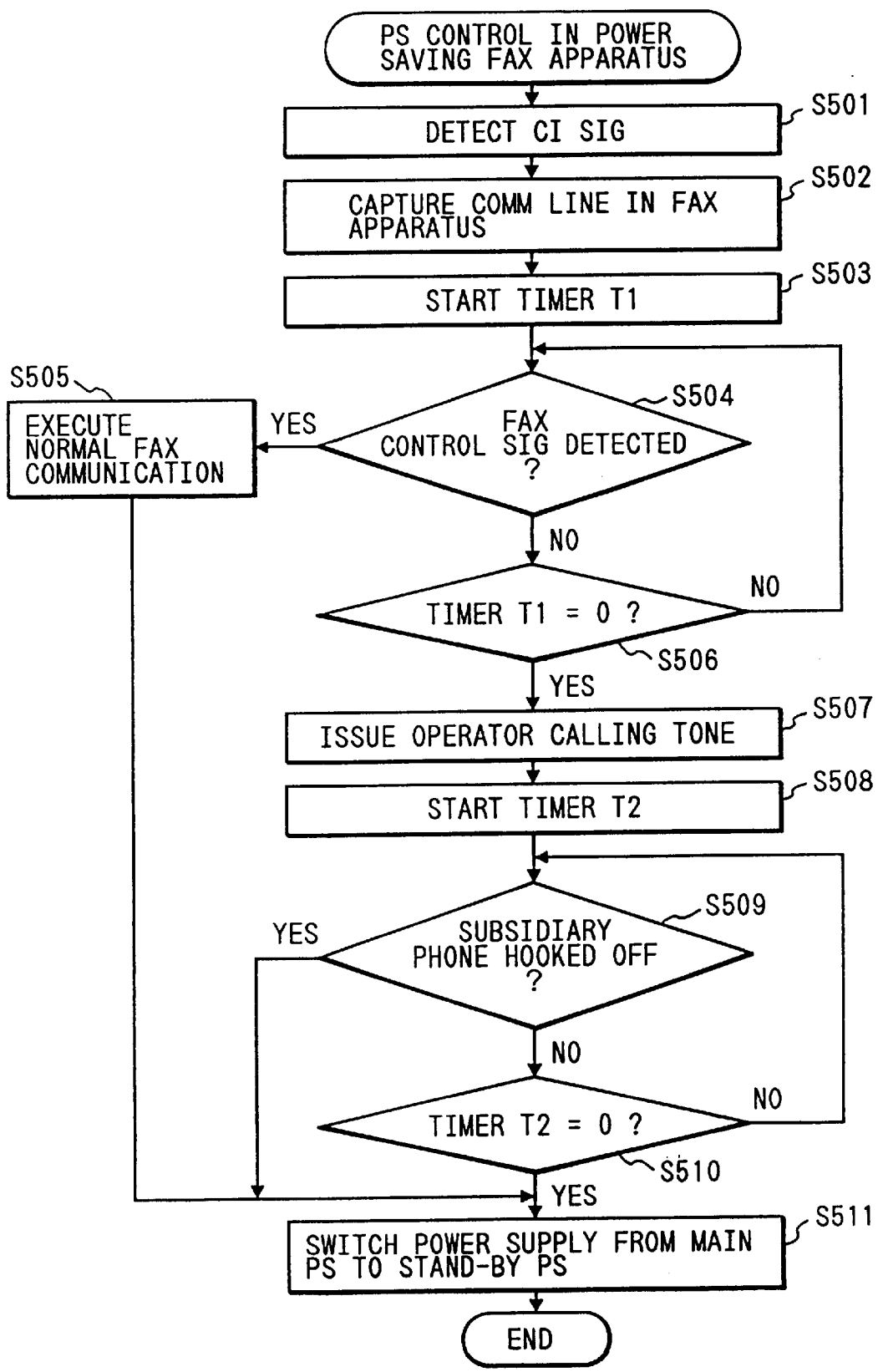
FIG. 25 is a flowchart of the processing for the seventh embodiment.

FIG. 25 is a flowchart showing the operation of the apparatus. At step S501, a call signal that has arrived across the communication line 410 is detected by the CI detector 415. At step S502, as a result of the CI detection, the facsimile machine that is being operated in an energy saving mode is controlled by the main SW controller 413 that it is now driven by an AC power supply. Then, the facsimile apparatus locks on to the communication line 410. At step S503, timer T1 is activated.

At step S504, a check is performed to determine whether or not the presence/absence of a control signal for facsimile procedures that is transmitted across the communication line 410 is detected. When no sound is carried by the communication line 410, the facsimile communication procedure signal is assumed to be present. When the procedure signal is detected, at step S505 normal facsimile communication is performed. After the communication has been completed, at step S511 the main SW controller 413 selects the secondary battery 417 as the power supply source in order to switch the facsimile machine to the energy saving mode. The process is thereafter terminated.

When, at step S504, the procedure signal is not detected, at step S506, a check is performed to determine whether or not the timer T1 has reached 0. If the timer T1 has not reached 0, program control returns to step S504. If the timer T1 has reached 0, at step S507 an operator calling tone is generated. As an operator calling tone, a pseudo calling tone that is generated by the pseudo CI generator 412 is used, and the tone is released through a loudspeaker that is provided in the facsimile machine.

At step S508, timer T2 is activated. At step S509, a check is performed to determine whether or not the external terminal (referred to as "an extension set"), such as a telephone set, that is connected to the facsimile machine is in the off-hook state. When the external terminal is in the off-hook state, program control moves to step S511. When the external terminal is not in the off-hook state, at step S510 a check is performed to determine whether or not the timer T2 has reached 0. If the timer T2 has not reached 0, program control returns to step S509. If the timer T2 has reached 0, program control shifts to step S511. At step S511, the main SW controller 413 selects the secondary battery 417 as the power supply source for the facsimile machine in order to change the mode to the energy saving mode.

Eighth Embodiment

Figure 26:
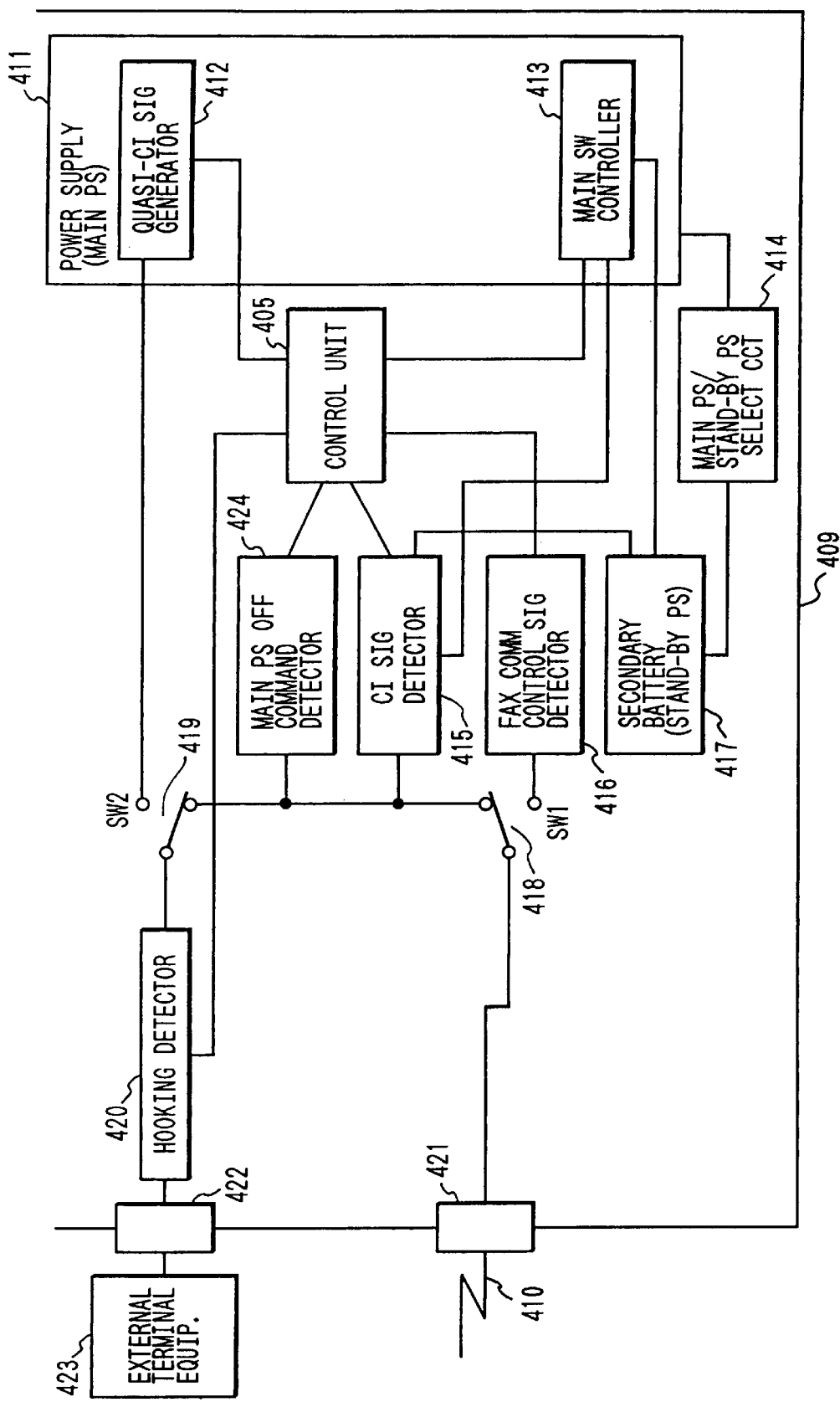
FIG. 26 is a block diagram illustrating the eighth embodiment.

FIG. 26 is a diagram illustrating an internal circuit of a communication unit 407 and a circuit for switching a power supply of an energy-saving facsimile machine according to an eighth embodiment. Only the sections that differ from those in the seventh embodiment will be explained. The same reference numbers as are used in the seventh embodiment are employed to denote corresponding or identical components, and no explanation for them will be given.

A main power supply OFF command detector 424 detects a command, which is transmitted from an external terminal 423, for shifting the mode of the facsimile machine to the energy saving mode.

Figure 27:
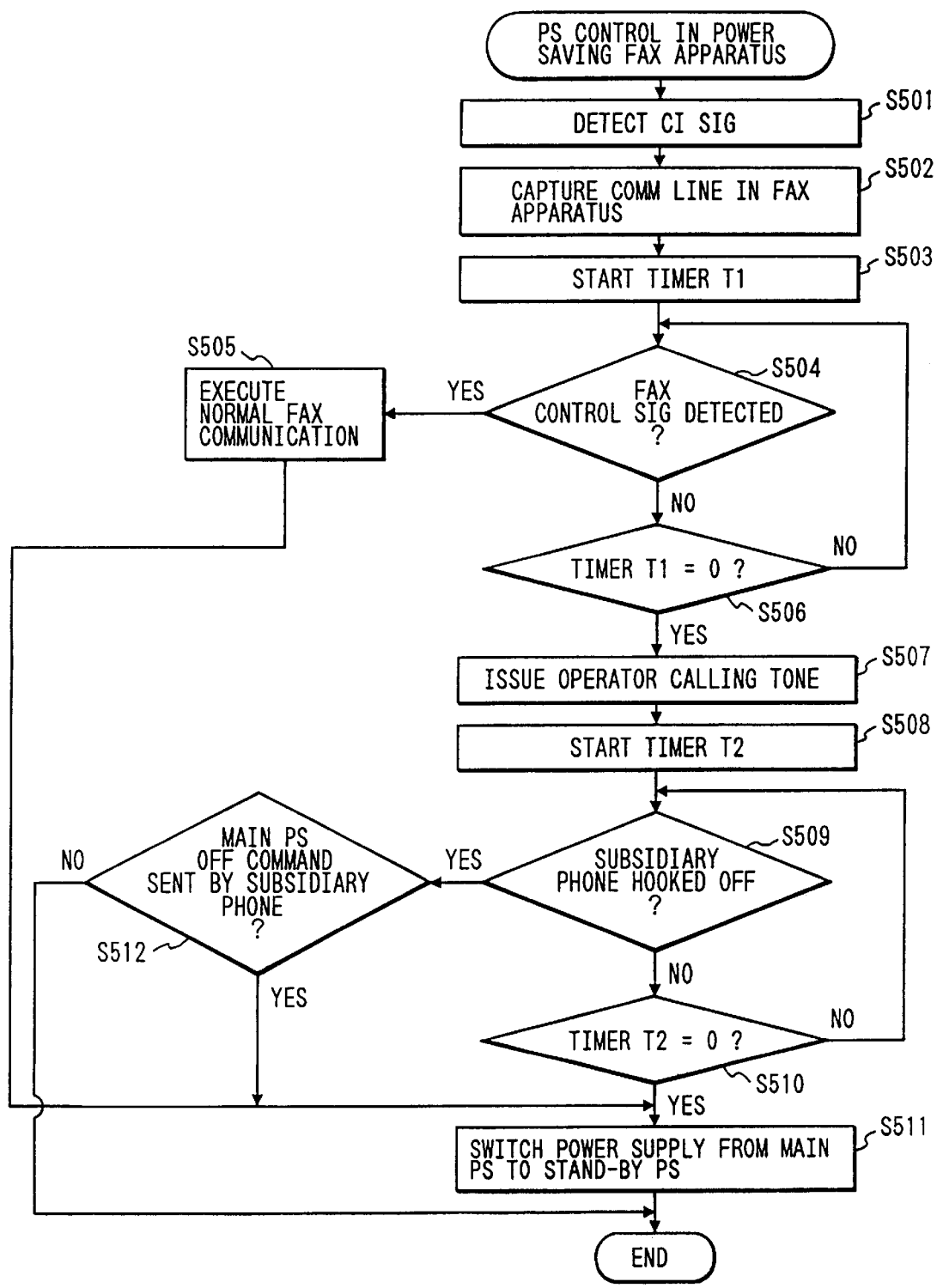
FIG. 27 is a flowchart of the processing for the eighth embodiment.

FIG. 27 is a flowchart for the processing of the apparatus. The procedures at steps S501 through S510 are the same as those in FIG. 25.

When, at step S509, an extension set is in the off-hook state, at step S512, the external terminal 423 employs a DTMF signal to generate a command for shifting the mode of the facsimile machine to the energy saving mode, and the main power supply OFF command detector 424 detects the generation of the command. When a command for shifting to the energy saving mode is transmitted, program control moves to step S511. When such a command is not transmitted, the process is terminated with the main power supply being ON.

As is described above, according to the seventh and the eighth embodiments, even in a facsimile machine that has a FAX/TEL switching mode, the main power supply is halted according to the off-hook state of the external terminal, or in response to a main power supply halt signal from the external terminal, and the secondary battery is selected for the supply of power. Therefore, when a terminal other than the extension terminal is not used and the facsimile machine need not be maintained in an operable state, the main power supply of the facsimile machine can be turned off so that energy saving is ensured.

What is claimed is:

1. A data communication machine comprising:

communication means for performing data communication;

power supply means, which is capable of being turned on and off, for supplying power to said communication means;

identification means for identifying plural types of call signals received through a communication line before line connection;

a single control means for turning on said power supply means and permitting said communication means to perform data communication in consonance with an identification result that is provided by said identification means; and setting means for setting a first type of a call signal for data communication, wherein said control means turns on said power supply means in consonance with the identification result only when a call signal through said communication line is identified by said identification means to be the first type of call signal.

2. A data communication machine according to claim 1, wherein said plural types of call signals are call signals that are used in Distinguish Ringing Pattern Detect Service.

3. A data communication machine according to claim 1, further comprising speech communication means for performing speech communication, wherein said setting means sets a second type of a call signal for speech communication and wherein, when a call signal across said communication line is identified by said identification means to be the second type of call signal, said control means does not turn on said power supply means.

4. A data communication machine according to claim 3, further comprising second setting means for setting no-ringing reception during which, upon receipt of an incoming call, an operator is not notified of said incoming call by ringing, wherein, when said no-ringing reception is set in said second setting means, said control means does not respond to the result obtained by said identification means and turns on said power supply means at a time of receipt of said incoming call.

5. A data communication machine according to claim 1, wherein said data communication machine is a facsimile apparatus.

6. A data communication machine according to claim 1, further comprising a network control unit for performing line connection and line disconnection, wherein said power supply means supplies power to said network control unit.

7. A data communication machine comprising:
   a main power supply, which is capable of being turned on and off, for supplying power to said data communication machine;
   a first controller for receiving power from said main power supply;
   a second controller for controlling both an ON/OFF state of said main power supply and a console unit that performs key input and display; and
   a sub-power supply for supplying power to said second controller, wherein said second controller turns off said main power supply in a standby state and determines a type of key input from the console unit, and, when said second controller determines, from the type of key input, that said first controller needs to be operated, said second controller turns on said main power supply to activate said first controller, while when said second controller determines, from the type of key input, that said first controller need not be operated, said second controller holds key-input data from the console unit without turning on said main power supply.

8. A data communication machine according to claim 7, wherein, when said first controller begins to operate, said second controller transfers, to said first controller, any key-input data that were held while said second controller was in the standby state.

9. A data communication machine according to claim 7, wherein said data communication machine is a facsimile apparatus.

10. A data communication machine comprising:
    communication means for performing data communication;
    power supply means, which is capable of being turned on and off, for supplying power to said communication means;
    identification means for identifying a telephone number, as an identified telephone number, at a calling side that is received, together with a call signal, through a communication line before line connection;
    setting means for setting a telephone number, as a set telephone number, of a calling side that is desired for communication;
    a single control means for turning on said power supply means and permitting said communication means to perform data communication in accordance with an identification of said identification means and the setting of said setting means,
    wherein said control means turns on said power supply means in accordance with the identification of said identification means and the setting of said setting means only for data communication and only when the identified telephone number is consistent with the set telephone number.

11. A data communication machine according to claim 10, further comprising an auto answering/recording function that has a personal absence/presence select means that selectively sets an absence mode and a presence mode, wherein, when said absence mode is selected, said control means turns on said power supply means in consonance with detection of a call signal, regardless of the identification and the setting.

12. A data communication machine according to claim 10, wherein said data communication machine is a facsimile apparatus.

13. A data communication machine according to claim 10, further comprising a network control unit for performing line connection and line disconnection, wherein said power supply means supplies power to said network control unit.

14. A data communication machine according to claim 10, further comprising a network control unit for performing line connection and line disconnection, wherein said control means controls said network control unit to perform the line connection when the first telephone number is consistent with the second telephone number, in accordance with the identification of said identification means and the setting of said setting means.

15. A data communication method in a data communication machine, comprising the steps of:
    performing data communication;
    supplying power to for said communication step using power supply means which is capable of being turned on and off;
    identifying plural types of call signals received through a communication line before line connection;
    controlling, using a single controlling means, the data communication machine by turning on the power supply means and permitting said communication step to perform data communication in consonance with an identification result that is provided by said identification step; and
    a setting step of setting a first type of a call signal for data communication, wherein said control step turns on the power supply means in consonance with the identification result only when a call signal through said communication line is identified by said identification step to be the first type of call signal.

16. A data communication method according to claim 15, wherein said plural types of call signals are call signals that are used in Distinguish Ringing Pattern Detect Service.

17. A data communication method according to claim 15, further comprising a speech communication step of performing speech communication, wherein said setting step sets a second type of a call signal for speech communication and wherein, when a call signal across said communication line is identified by said identification step to be the second type of call signal, said control step does not turn on the power supply means.

18. A data communication method according to claim 17, further comprising a second setting step for setting no-ringing reception during which, upon receipt of an incoming call, an operator is not notified of said incoming call by ringing, wherein, when said no-ringing reception is set in said second setting step, said control step does not respond to the result obtained by said identification step and turns on the power supply means at a time of receipt of said incoming call.

19. A data communication method according to claim 15, wherein the data communication machine is a facsimile apparatus.

20. A data communication method according to claim 15, wherein the data communication means has a network control unit for performing line connection and line disconnection, and wherein the power supply means supplies power to the network control unit.

21. A data communication method in a data communication machine, comprising:
    a power supply step of supplying power to the data communication machine using a main power supply which is capable of being turned on and off;

a first controlling step of receiving power from the main power supply;

a second controlling step of controlling both an ON/OFF state of the main power supply and a console unit that performs key input and display; and a sub-power supply step of supplying power for said second controlling step, wherein said second controlling step turns off the main power supply in a standby state and determines a type of key input from the console unit, and, when said second controlling step determines, from the type of key input, that said first controlling step needs to be operated, said second controlling step turns on the main power supply to activate the first controlling step, while when the second controlling step determines, from the type of key input, that said first controlling step need not be operated, said second controlling step holds key-input data from the console unit without turning on the main power supply.

22. A data communication machine according to claim 21, wherein, when said first controlling step begins to operate, said second controlling step transfers, for use in said first controlling step, any key-input data that were held while said second controlling step was in the standby state.

23. A data communication method according to claim 21, wherein the data communication machine is a facsimile apparatus.

24. A data communication method in a data communication machine, comprising the steps of:

performing data communication;

supplying power to for communication step using power supply means which is capable of being turned on and off;

identifying a telephone number, as an identified telephone number, at a calling side that is received, together with a call signal, through a communication line before line connection;

setting a telephone number, as a set telephone number, of a calling side that is desired for communication; and controlling, using a single control means, the data communication machine to turn on the power supply means and permitting said communication step to perform data communication in accordance with an identification of said identification step and the setting of said setting step, wherein said control step turns on the power supply means in accordance with the identification of said identification step and the setting of said setting step only for data communication and only when the identified telephone number is consistent with the set telephone number.

25. A data communication method according to claim 24, further comprising an auto answering/recording function that has a personal absence/presence select means that selectively sets an absence mode and a presence mode, wherein, when said absence mode is selected, said control step turns on the power supply means in consonance with detection of a call signal, regardless of the identification and the setting.

26. A data communication method according to claim 24, wherein the data communication machine is a facsimile apparatus.

27. A data communication method according to claim 24, wherein the data communication machine has a network control unit for performing line connection and line disconnection, and wherein the power supply means supplies power to the network control unit.

28. A data communication method according to claim 24, wherein the data communication machine has a network control unit for performing line connection and line disconnection, wherein said control step controls the network control unit to perform the line connection when the first telephone number is consistent with the second telephone number, in accordance with the identification of said identification step and the setting of said setting step.

* * * * *

UNITED STATES PATENT AND TRADEMARK OFFICE
CERTIFICATE OF CORRECTION

PATENT NO. : 6,088,128
DATED : July 11, 2000
INVENTOR(S) : TERUYUKI NISHII ET AL.

Page 1 of 2

It is certified that error appears in the above-identified patent and that said Letters Patent is hereby corrected as shown below:

[57] ABSTRACT

Line 10, "pattern" should read --patterns--.

COLUMN 6

Line 8, "voltage detector" should read
      --voltage detector 24--.

COLUMN 11

Line 40, "on" should read --of--.
    Line 49, "was" should read --is--.
    Line 58, "S124)," should read --S24),--.

COLUMN 12

Line 50, "all" should read --call--.
    Line 51, "208b." should read --208c.--.
    Line 53, "208b." should read --208c.--.

UNITED STATES PATENT AND TRADEMARK OFFICE
CERTIFICATE OF CORRECTION

PATENT NO. : 6,088,128

DATED : July 11, 2000

INVENTOR(S) : TERUYUKI NISHII ET AL.

It is certified that error appears in the above-identified patent and that said Letters Patent is hereby corrected as shown below:

COLUMN 13

Line 57, "244 information" should read --244 registers information--.

COLUMN 15
   Line 64, "at which step" should be deleted.

COLUMN 24

Line 19, "for" should be deleted.

COLUMN 25

Line 31, "for" should be deleted.

Signed and Sealed this

Seventeenth Day of April, 2001

Attest:

NICHOLAS P. GODICI

Attesting Officer     Acting Director of the United States Patent and Trademark Office